United States Patent [19]

Fujitani et al.

[11] Patent Number: 4,883,185
[45] Date of Patent: Nov. 28, 1989

[54] SUSPENSION TYPE TRANSPORTER FOR A BOLT DRAWING MACHINE AND POSITIONING CONTROLLER THEREFOR

[75] Inventors: Takashi Fujitani; Hiromi Uemura, both of Osaka; Toshiaki Kishimoto, Fukuoka; Masayuki Uchiyama, Tokyo; Isao Shirasu, Kobe; Hideyuki Kurokawa, Kobe; Takashi Nishioka, Kobe; Kenji Kikukawa; Yoshinori Sato, both of Kanagawa, all of Japan

[73] Assignees: The Hokkaido Electric Power Co., Inc., Hokkaido; The Kansai Electric Power Co., Inc., Osaka; Shikoku Electric Power Co., Inc., Kagawa; Kyushu Electric Power Co., Inc., Fukuoka; The Japan Atomic Power Company, Tokyo; Mitsubishi Jukogyo Kabushiki Kaisha, Tokyo; The Japan Steel Works, Ltd., Tokyo, all of Japan

[21] Appl. No.: 57,908
[22] PCT Filed: Aug. 28, 1985
[86] PCT No.: PCT/JP85/00474
    § 371 Date: Nov. 2, 1987
    § 102(e) Date: Nov. 2, 1987
[87] PCT Pub. No.: WO87/01364
    PCT Pub. Date: Mar. 12, 1987
[51] Int. Cl.⁴ .............................................. B23K 9/12
[52] U.S. Cl. ..................................... 212/147; 212/221
[58] Field of Search .............. 212/205, 220, 221, 222, 212/218, 219, 147

[56] References Cited

U.S. PATENT DOCUMENTS 2,178,956 11/1939 Dyer .................................. 212/221
3,074,562 1/1963 Clayborne ......................... 212/221
4,110,596 8/1978 Okamoto et al. ................. 212/220
4,169,977 10/1979 Pedersen ............................ 212/220

FOREIGN PATENT DOCUMENTS 0009750 1/1985 European Pat. Off. .
1160597 2/1960 Fed. Rep. of Germany .
1556326 12/1967 Fed. Rep. of Germany .
2061037 7/1976 Fed. Rep. of Germany .
3240320 5/1983 Fed. Rep. of Germany .
3445830 6/1986 Fed. Rep. of Germany .
26913 11/1968 Japan .
128444 9/1974 Japan .
100562 9/1976 Japan .
30753 9/1979 Japan .
258 1/1981 Japan .
26553 6/1981 Japan .

Primary Examiner—Sherman D. Basinger
Assistant Examiner—Stephen P. Avila
Attorney, Agent, or Firm—Toren, McGeady & Associates

[57] ABSTRACT

A suspension type transporter suspends a bolt drawing machine through a trolley and a hoist above a pressure container having many bolt attached thereto and transports the bolt drawing machine to a target position. A track settling portion having a guide is provided on an outer periphery of a lid of the pressure container. The suspension type transporter for the bolt drawing machine comprises a guide mechanism which restricts movement of the bolt drawing machine in the air by the guide. The guide mechanism of the transporter is provided with a position detector which can detect a position of the bolt drawing machine. A positioning controller of the suspension type transporter controls the transporter so that the transporter starts at slow speed, is then accelerated to a prescribed speed and is gradually decelerated near the target position.

12 Claims, 20 Drawing Sheets

FIG. I(A)
FIG. I(B)
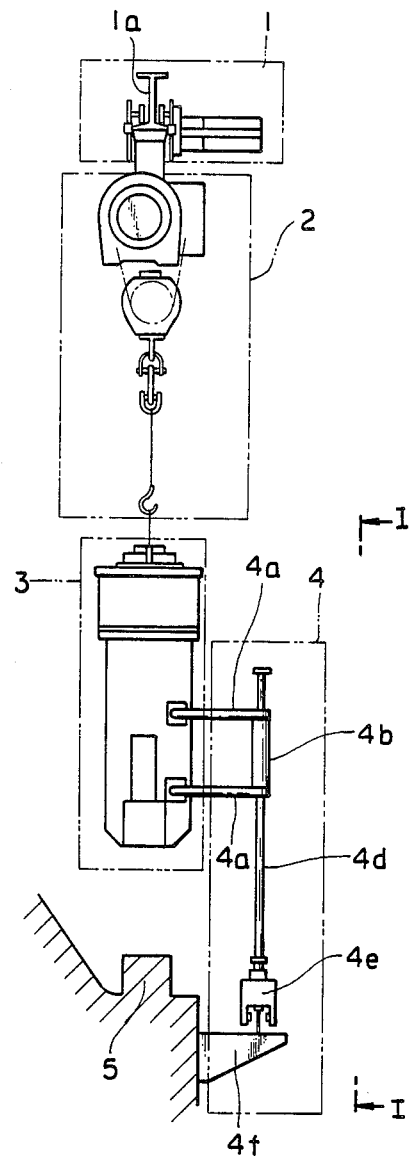
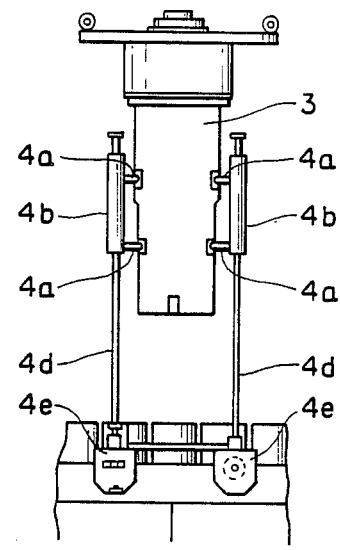

F I G. 3(A)
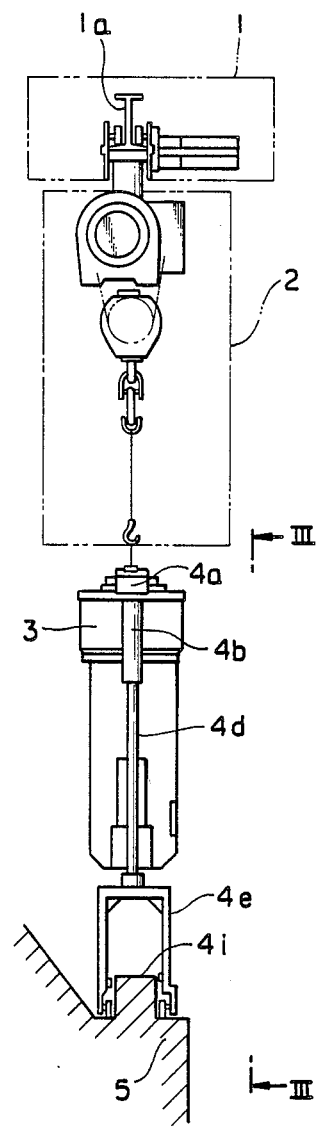
F I G. 3(B)
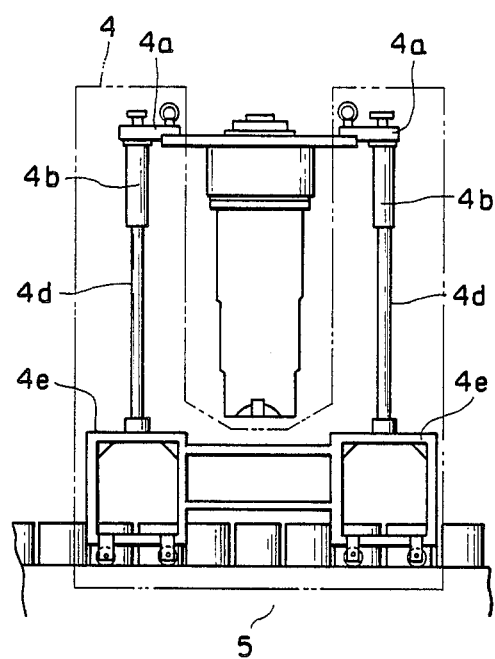

FIG.10(A)
FIG.10(B)
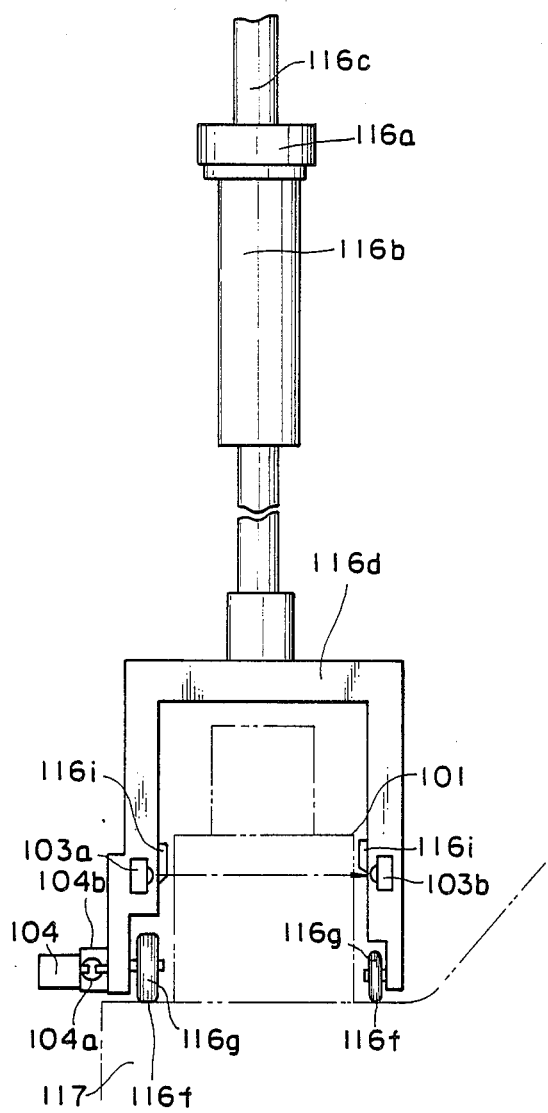
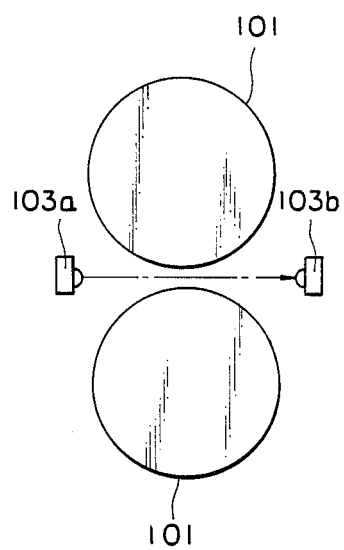

F I G. 14
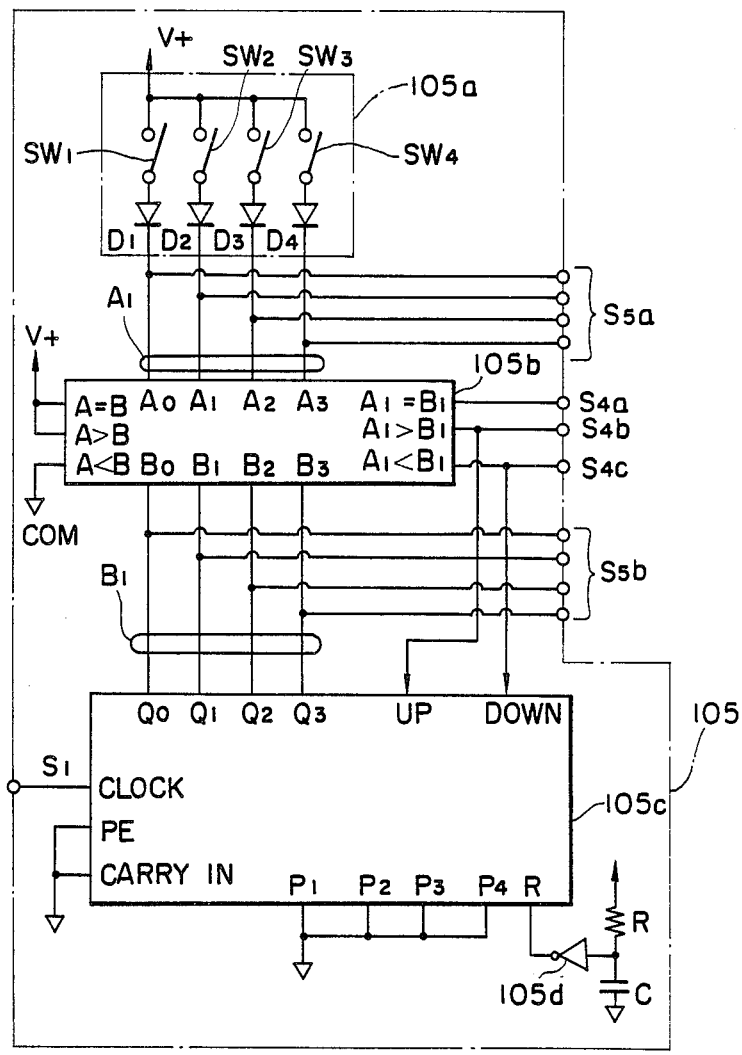

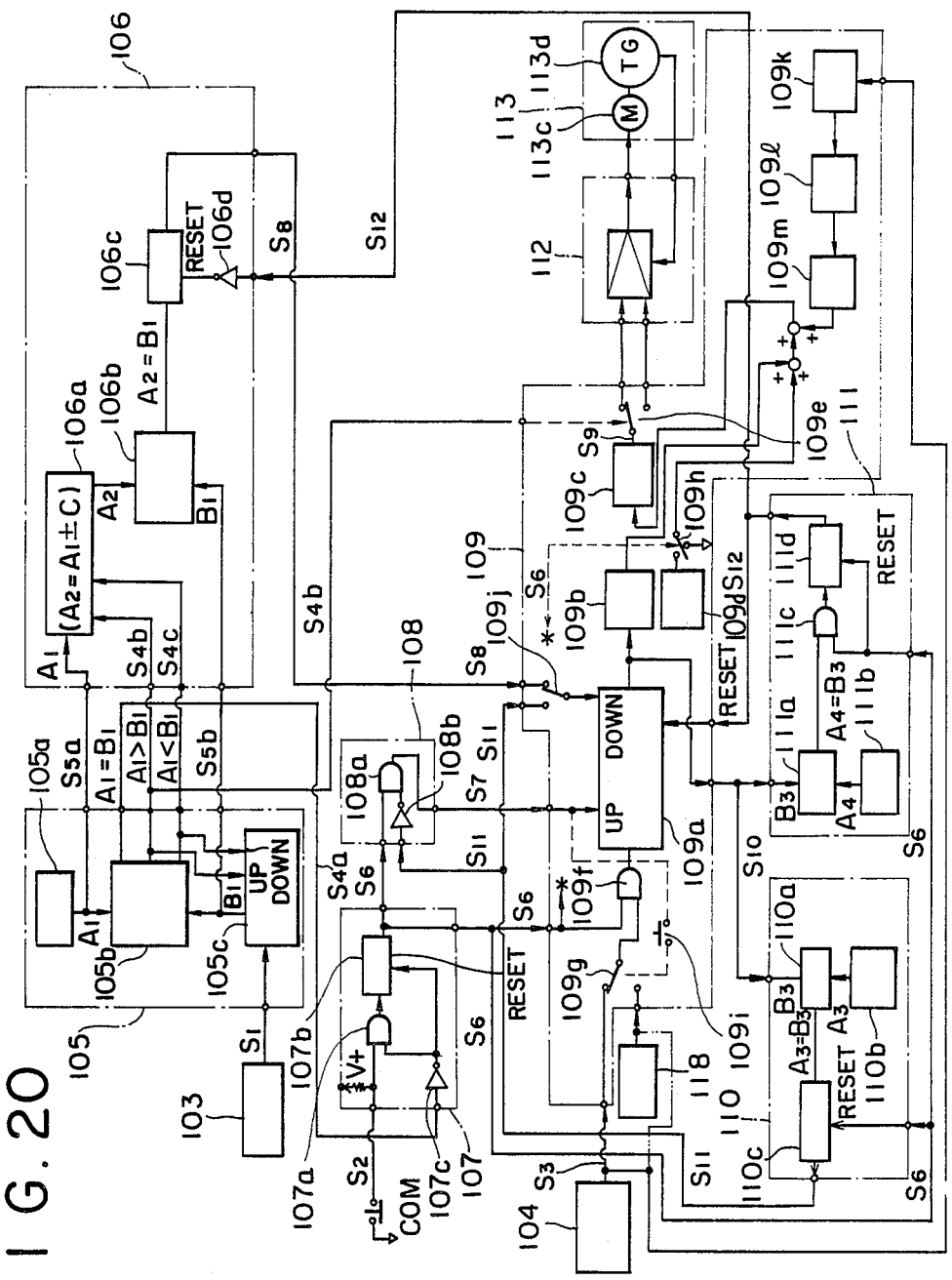
F I G. 20

STUD BOLT DETECTING RANGE

DESIRED VELOCITY PATTERN

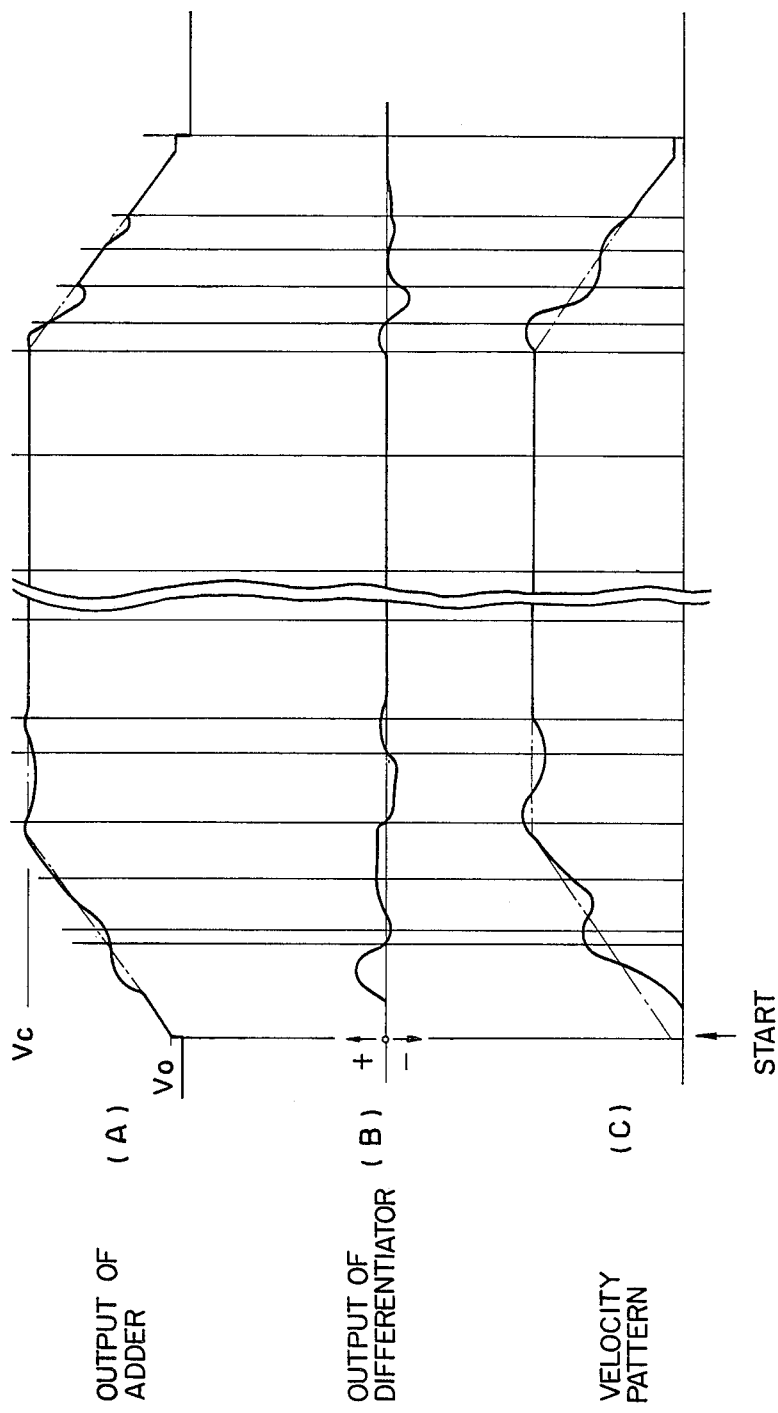

SUSPENSION TYPE TRANSPORTER FOR A BOLT DRAWING MACHINE AND POSITIONING CONTROLLER THEREFOR

TECHNICAL FIELD

The present invention relates to a suspension type transporter for a bolt drawing machine and its positioning controller, and more particularly to a transporter which transports the bolt drawing machine to a target position while restraining movement of the bolt drawing machine by a guide mechanism so that a wire suspending the bolt drawing machine is prevented from twisting and rolling when the bolt drawing machine is suspended with a hook and is transport to the target position and its positioning controller which can correct deviation of moving distance caused by the swinging of the wire in the traveling direction thereof and extension of the wire.

BACKGROUND ART

A conventional suspension type bolt drawing machine is suspended through a trolley and a hoist which are disposed above a pressure container to which bolts are attached and can be moved horizontally and vertically. Such a bolt drawing machine is positioned above a predetermined bolt (or stud) and then lowered, and at this time it is necessary to position the bolt drawing machine exactly. A conventional bolt drawing machine approaches a target bolt by repeating visual confirmation and approach, and the trolley is moved to the target position. However, with such a bolt drawing machine and the positioning manner, precise positioning can not be attained. More particularly, in order to lift up and down the bolt drawing machine without collision of the bolt drawing machine to the bolt, the positioning accuracy of ± 3 mm or less is required. However, only control of a halt position of the trolley can not obtain such high accuracy. If the bolt drawing machine comes into contact with the bolt when the bolt drawing machine is lifted up and down, accurate and expensive threads of both may be damaged each other.

In the conventional suspension type transporter, there is a case where a hydraulic or pneumatic hose and a cable are hung down from the trolley and coupled with the bolt drawing machine. In this case, when the bolt drawing machine is lifted up and down by the hoist, bending force and weight of the hose and the cable are applied to the bolt drawing machine and the wire suspending the bolt drawing machine is twisted. Accordingly, the bolt drawing machine may not take a preferable position with respect to the bolt. Further, when moving on a traveling path which curves at a certain radius of curvature, the bolt drawing machine is swung outside to cause rolling. When external force produced by an earthquake is further applied, twist and rolling are both produced. In such a situation, when the bolt drawing machine is to be positioned, exact positioning of the bolt drawing machine is not possible due to the twist and rolling.

Further, when the bolt drawing machine is hung down to be transported by the conventional suspension type transporter under control of its controller, the bolt drawing machine tends to be swung forward and backward in the traveling direction. Thus, not only deviation of phase in traveling occurs between the trolley and the bolt drawing machine, but also deviation of moving distance occurs due to extension of the wire. Accordingly, when the position is detected by the trolley, the positioning accuracy of the bolt drawing machine is reduced.

The present invention has been made to improve the above drawbacks.

It is a first object of the present invention to provide a suspension type transporter in which twist and rolling of a wire suspending a bolt drawing machine is prevented to be able to attain accurate positioning.

It is a second object of the present invention to provide a positioning controller for a suspension type transporter which detects deviation of moving distance due to swing of the bolt drawing machine in the traveling direction and extension of a wire to correct the deviation so that the transporter can be positioned with high accuracy.

DISCLOSURE OF THE INVENTION

In brief, in order to achieve the above objects, according to the first invention, there is provided a suspension type transporter for a bolt drawing machine comprising a track settling portion including a guide disposed on an outer periphery of a lid of a pressure container and a guide mechanism for restricting movement of the bolt drawing machine in the air by means of the guide.

The second and third inventions which attain the above objects are directed to a positioning controller which comprises a position detector provided in the guide mechanism of the transporter according to the first invention and capable of detecting a position of the bolt drawing machine, the number of pulses generated from the position detector being calculated to control the suspension type transporter so that the transporter is started at slow speed, is gradually accelerated to a prescribed speed and is then gradually decelerated near a target stop position, that is, a traveling speed of the transporter is set to a velocity pattern in the form of trapezoid or triangle. The third invention further comprises, in addition to the second invention, a feedback for controlling acceleration.

More particularly, in order to achieve the above objects, the present invention is configured as follows.

(I) The suspension type transporter according to the first invention which suspends a bolt drawing machine to transport it, comprises:

a guide mechanism including a holding member mounted to the bolt drawing machine, a cylindrical slide holder mounted vertically to the holding member, a main shaft penetrating the slide holder movably in the vertical direction and rotatably, a wheel support mounted to a lower end of the main shaft, a wheel supported by the wheel support to rotate on a track disposed on a stationary portion at a floor side, a guide provided along the stationary portion, and a guided contact portion disposed to a side surface of the guide (or the wheel support) to be opposed to the wheel support (or the guide) with a small gap between the wheel support (or the guide) and the contact portion, whereby movement of the bolt drawing machine in the air is restricted.

In the invention, the guide may be provided on both sides of the track.

(II) The positioning controller of the suspension type transporter according to the second invention provided with a guide mechanism including a holding member mounted to a suspension type bolt drawing machine, a cylindrical slide holder mounted vertically to the holding member, a main shaft penetrating the slide holder movably in the vertical direction and rotatably, a wheel support mounted to a lower end of the main shaft, a wheel supported by the wheel support to rotate on a track disposed on a stationary portion at a floor side, a guide provided along the stationary portion, and a guided contact portion disposed to a side surface of the guide (or the wheel support) to be opposed to the wheel support (or the guide) with a small gap between the wheel support (or the guide) and the contact portion, whereby movement of the bolt drawing machine in the air is restricted, comprises:

a position detector provided in the guide mechanism for detecting successively a multiple of position detecting objects juxtaposed along the guide to produce a pulse $S_1$ in order to stop the bolt drawing machine at a target position; a continuous moving distance detector for detecting a moving distance of the bolt drawing machine from a first detection position in which a first position detecting object is detected to produce a pulse train $S_3$ or a pulse generator for generating a pulse train in response to the moving distance of the bolt drawing machine; a transit discrimination circuit for producing a signal $S_{5b}$ for a count (number of the position detecting object at a current position) $B_1$ of the output pulse of the position detector, a signal $S_{5a}$ for a set point of a transit number (number of the position detecting object at the target position) $A_1$, and signals $S_{4a} \sim S_{4c}$ corresponding to comparison results $A_1=B_1$, $A_1>B_1$ and $A_1<B_1$ of the signals $S_{5a}$ and $S_{5b}$; an operation command circuit which is supplied with the signal $S_{4a}$ corresponding to the comparison result $A_1=B_1$ of the transit discrimination circuit and a start signal $S_2$ to produce an operation command signal $S_6$ when $A_1 \neq B_1$ and prohibit operation when $A_1=B_1$; an acceleration command circuit which is supplied with an output of the operation command circuit to produce an acceleration command signal $S_7$; a deceleration command circuit which is supplied with the signals $S_{5a}$, $S_{5b}$, $S_{4b}$ and $S_{4c}$ corresponding to $A_1$, $B_1$, $A_1>B_1$ and $A_1<B_1$ to produce a deceleration command signal $S_8$; a velocity pattern programming circuit which is supplied with the operation command signal $S_6$ to produce a set signal of slow speed and in which an output signal of the continuous moving distance detector or the pulse generator is integrated in response to the acceleration command signal $S_7$ until the output of the continuous moving distance detector or the pulse generator reaches a set point of acceleration stop after start and the integration is stopped when the output reaches the set point of acceleration stop while the value integrated during acceleration is reduced in response to the deceleration command signal $S_8$ until the integrated value reaches a set point of deceleration finish, so that a sum signal of an analog signal corresponding to the integrated value or the reduced value and the set signal of slow speed is produced to be supplied to a controller for a variable speed motor of the suspension type transporter; an acceleration stop command circuit for comparing a signal $S_{10}$ corresponding to the integrated value or the reduced value of the velocity pattern programming circuit with a set signal $A_3$ corresponding to an acceleration stop position and producing an acceleration stop signal $S_{11}$ when both the signals are equal thereby to prohibit operation of the acceleration command circuit; and a deceleration finish detector circuit for comprising the signal $S_{10}$ with a set signal $A_4$ corresponding to a velocity of zero and producing a deceleration finish signal $S_{12}$ when both the signals are equal thereby to prohibit the reduction operation of the velocity pattern programming circuit and operation of the deceleration command circuit.

(III) The positioning controller of the suspension type transporter according to the third invention provided with a guide mechanism including a holding member mounted to a suspension type bolt drawing machine, a cylindrical slide holder mounted vertically to the holding member, a main shaft penetrating the slide holder movably in the vertical direction and rotatably, a wheel support mounted to a lower end of the main shaft, a wheel supported by the wheel support to rotate on a track disposed on a stationary portion at a floor side, a guide provided along the stationary portion, and a guided contact portion disposed to a side surface of the guide (or the wheel support) to be opposed to the wheel support (or the guide) with a small gap between the wheel support (or the guide) and the contact portion, whereby movement of the bolt drawing machine in the air is restricted, comprises:

a position detector provided in the guide mechanism for detecting successively a multiple of position detecting objects juxtaposed along the guide to produce a pulse $S_1$ in order to stop the bolt drawing machine at a target position; a continuous moving distance detector for detecting a moving distance of the bolt drawing machine from a first detection position in which a first position detecting object is detected to produce a pulse train $S_3$ or a pulse generator for generating a pulse train in response to the moving distance of the bolt drawing machine; a transit discrimination circuit for producing a signal $S_{5b}$ for a count (number of the position detecting object at a current position) $B_1$ of the output pulse of the position detector, a signal $S_{5a}$ for a set point of a transit number (number of the position detecting object at the target position) $A_1$, and signals $S_{4a} \sim S_{4c}$ corresponding to comparison results $A_1=B_1$, $A_1>B_1$ and $A_1<B_1$ of the signals $S_{5a}$ and $S_{5b}$; an operation command circuit which is supplied with the signal $S_{4a}$ corresponding to the comparison result $A_1=B_1$ of the transit discrimination circuit and a start signal $S_2$ to produce an operation command signal $S_6$ when $A_1 \neq B_1$ and prohibit operation when $A_1=B_1$; an acceleration command circuit which is supplied with an output of the operation command circuit to produce an acceleration command signal $S_7$; a deceleration command circuit which is supplied with the signals $S_{5a}$, $S_{5b}$, $S_{4b}$ and $S_{4c}$ corresponding to $A_1$, $B_1$, $A_1>B_1$ and $A_1<B_1$ to produce a deceleration command signal $S_8$; a velocity-acceleration pattern programming circuit which is supplied with the operation command signal $S_6$ to produce a set signal of slow speed and in which an output signal of the continuous moving distance detector or the pulse generator is integrated in response to the acceleration command signal $S_7$ until the output of the continuous moving distance detector or the pulse generator reaches a set point of acceleration stop after start and the integration is stopped when the output reaches the set point of acceleration stop while the value integrated during acceleration is reduced in response to the deceleration command signal $S_8$ until the integrated value reaches a set point of deceleration finish, so that a sum signal of an analog signal corresponding to the integrated value or the reduced value, the set signal of slow speed and a signal obtained by converting the output of the continuous moving distance detector into an analog signal corresponding to a frequency and differentiating the analog signal is produced to be supplied to a controller for a variable speed motor of the suspension type transporter; an acceleration stop command circuit for comparing a signal $S_{10}$ corresponding to the integrated value or the reduced value of the velocity-acceleration pattern programming circuit with a set signal $A_3$ corresponding to an acceleration stop position and producing an acceleration stop signal $S_{11}$ when both the signals are equal thereby to prohibit operation of the acceleration command circuit; and a deceleration finish detector circuit for comparing the signal $S_{10}$ with a set signal $A_4$ of deceleration finish and producing a deceleration finish signal $S_{12}$ when both the signals are equal thereby to prohibit the reduction operation of the velocity-acceleration pattern programming circuit and operation of the deceleration command circuit.

The present invention comprises the above structure and accordingly possesses the following effects (I), (II) and (III):

(I) According to the first invention, the suspension type transporter is provided with the guide mechanism which restricts movement of the bolt drawing machine in the air, and twist of the wire and rolling of the bolt drawing machine caused by, for example, weight and bending force of the hydraulic or pneumatic hose and the cable or the centrifugal force upon traveling in a curve or external force of earthquake can be prevented when the bolt drawing machine is hung by a hook. Accordingly, the positioning of the bolt drawing machine can be attained exactly.

(II) According to the second invention, since the guide mechanism coupled with the bolt drawing machine comprises the position detector which detects the position of the bolt drawing machine, there is no influence due to positional deviation between the bolt drawing machine and the trolley. The traveling speed of the transporter is controlled in accordance with the velocity pattern in the form of trapezoid or triangle so that the transporter is started at slow speed, is gradually accelerated to a prescribed speed and is thereafter gradually decelerated near a target stop position to be stopped at slow speed. Accordingly, swing in the traveling direction of the bolt drawing machine can be minimized, and even if deviation in the traveling phase between the bolt drawing machine and the trolley and deviation in the moving distance due to extension of the wire occur, the positioning accuracy of the bolt drawing machine can be maintained high.

(III) According to the third invention, the transporter is started at slow speed in response to the set signal of slow speed, and after the transporter is started, the number of pulses corresponding to the moving distance of the bolt drawing machine is integrated. The analog signal corresponding to the integrated value, the set signal of slow speed and the signal obtained by converting the number of pulses corresponding to the moving distance of the bolt drawing machine into the analog signal corresponding to a frequency and differentiating the analog signal are summed and the transporter is accelerated to the prescribed speed by the summed signal. Thereafter, the number of pulses corresponding to the moving distance of the bolt drawing machine is reduced from the integrated value near the target position. The analog signal corresponding to the reduced value, the set signal of slow speed and the signal obtained by converting the number of pulses corresponding to the moving distance of the bolt drawing machine into the analog signal corresponding to a frequency and differentiating the analog signal are summed. The transporter is gradually decelerated by the summed signal and the speed of the transporter is controlled in accordance with the velocity-acceleration pattern in the form of trapezoid or triangle so that the transporter is stopped at slow speed. Accordingly, swing in the traveling direction of the bolt drawing machine can be minimized extremely.

BRIEF DESCRIPTION OF DRAWINGS

FIGS. 1(A) and (B) illustrate a structure of a first embodiment of the first invention;

FIGS. 3(A) and (B) illustrate a structure of a second embodiment of the first invention;

FIG. 10(A) illustrates a structure of another embodiment of the second invention;

FIG. 10(B) illustrates a position detection relation of the bolt drawing machine;

FIG. 14 is an actual circuit diagram showing a transit discrimination circuit in the second invention;

FIG. 20 is s circuit diagram showing a configuration of an embodiment of a controller of the third invention;

FIG. 24 illustrates operation of the controller of the third invention.

THE BEST MODE FOR CARRYING OUT THE INVENTION

Embodiments of the present invention are now described in detail with reference to drawings

FIRST EMBODIMENT OF THE FIRST INVENTION

Figure 2:
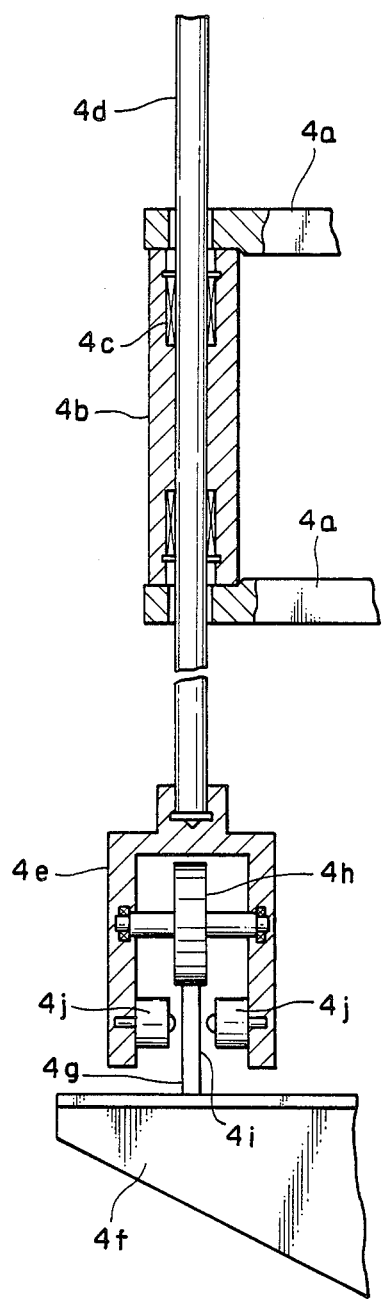
FIG. 2 is a sectional view of a portion of FIG. 1(A)

FIG. 1(A) illustrates the first embodiment of the apparatus of the present invention and FIG. 1(B) is a side view of the apparatus of FIG. 1(A) as viewed from line I—I of FIG. 1(A). FIG. 2 is a sectional view of a portion of the apparatus of FIG. 1.

Referring to FIGS. 1 and 2, a trolley 1 and a hoist 2 form a suspension type transporter which hangs down a bolt drawing machine 3 to transport it.

Two pairs of holder members 4a each pair of which including two holding members disposed at upper and lower sides are fixedly mounted horizontally in a perpendicular direction to a traveling direction in the left and right sides of a drum of the bolt drawing machine, respectively. Cylindrical slide holders 4b are vertically mounted to the two pairs of holding members 4a, respectively, and main shafts 4d penetrate hollow portions of the right and left slide holders 4b through bearings 4c movably in the vertical direction and rotatably.

A U-shaped wheel support 4e is attached to a lower end of the right and left main shafts 4d. Supported between both plates of the U-shaped wheel support 4e is a wheel 4h which rotates on a track 4g of a track settling portion 4f provided on a side wall of a stationary portion 5 at a floor side. Disposed on a inner surface at a lower portion of each of the plates of the wheel support 4e is a guided contact portion 4j opposite to a guide 4i formed of a side surface of the track 4g while maintaining small gap between the contact portion 4j and the guide 4i. The guided contact portion 4j uses a universal caster type containing a ball.

The above members 4a to 4j form a guide mechanism 4 which restricts movement of the bolt drawing machine 3 in the air.

[OPERATION OF THE FIRST EMBODIMENT]

Operation is now described. The main shaft 4d and the U-shaped wheel support 4e are supported on the track 4g through the wheel 4h so that the weight thereof falls on the track 4g without hanging on the bolt drawing machine 3. The main shaft 4d and the U-shaped wheel support 4e are prevented by the slide holder 4b from falling down.

When the suspension type transporter travels on a traveling path (formed of an I-shaped beam) 1a and transports the suspended bolt drawing machine 3, traveling power in the traveling direction of the transporter is transmitted to the main shaft 4d through the holding member 4a and the slide holder 4b, and the wheel 4h rotates. Accordingly, the wheel support 4e moves on the track 4g together with the bolt drawing machine 3. In this case, since lateral movement of the wheel support 4e is restricted by the guide 4i and the guided contact portion 4j, the wheel support 4e and hence the main shaft 4d are not twisted and rolled and can moves without deviation from the track 4g.

Further, when the traveling path 1a is installed to be curved with a certain radius of curvature, it is a matter of course that the track 4g is also installed to be curved corresponding to the curvature of the traveling path 1a. When traveling on the curved path, the main shaft 4d can be angularly moved to travel on the curved path smoothly in the same manner as in traveling on a straight path and the rolling due to centrifugal force can be prevented.

When the hoist 2 is operated to lift up and down the bolt drawing machine 3, the main shaft 4d and the U-shaped wheel support 4e are not lifted up by friction between the main shaft 4d and the slide holder 4b since the main shaft 4d penetrates the slide holder 4b movably in the vertical direction and the friction therebetween is very small as compared with weight of the main shaft 4d and the wheel support 4e.

[STRUCTURE OF SECOND EMBODIMENT]

In the first embodiment, since the track settling portion 4f and the track 4g are attached to the side surface of the stationary portion at the floor side, much labor is required for the construction work thereof and the cost of the construction and installation is expensive. Further, the guide mechanism is disposed on one side with regard to the traveling direction and the balance in suspension is wrong.

Figure 4:
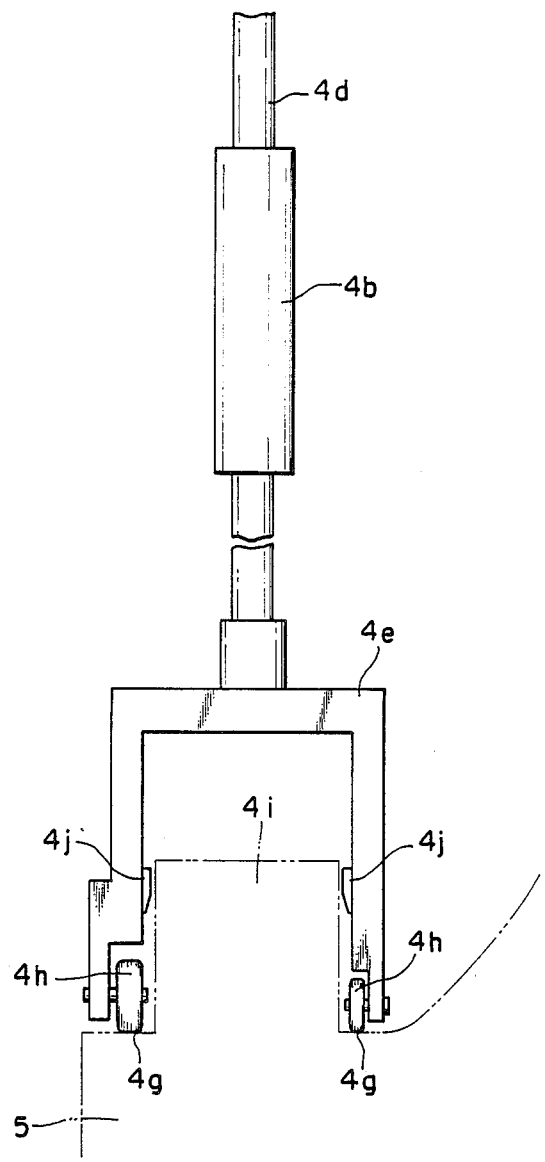
FIG. 4 is a side view of a portion of FIG. 3(A)
Figure 5A:
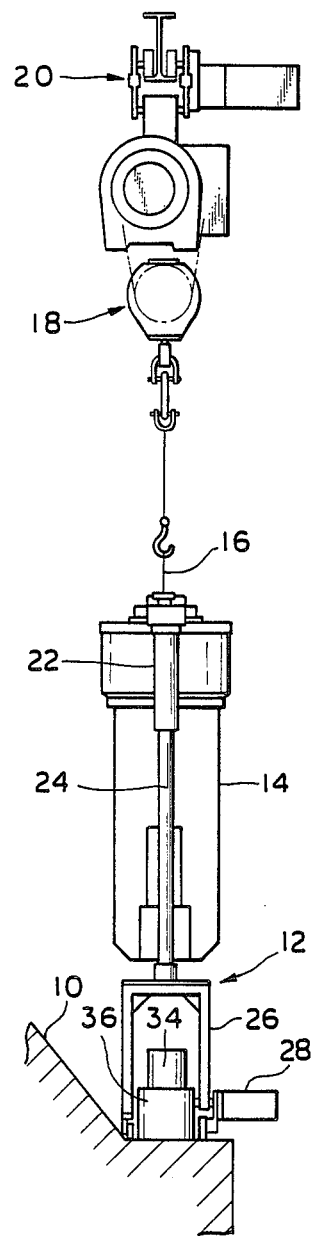
FIGS. 5(A) and (B) illustrate a structure of a bolt drawing machine to which a third embodiment of the first invention is applied.
Figure 5B:
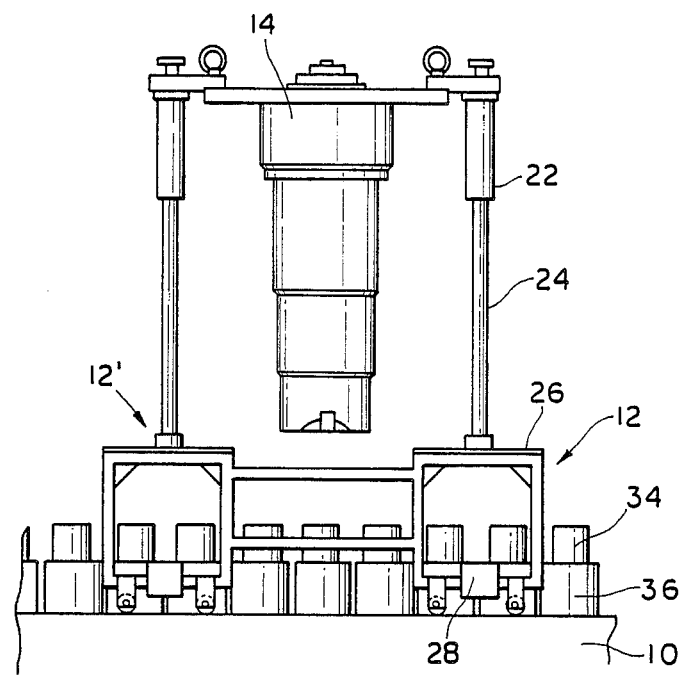

The second embodiment is to solve the drawbacks. FIG. 3(A) illustrates a structure of the second embodiment and FIG. 3(B) is a side view as viewed from line III—III of FIG. 3(A). FIG. 4 is a front view of a portion thereof.

Holding members 4a are fixedly mounted on right and left sides of a top portion of the bolt drawing machine 3 horizontally in the traveling direction. Cylindrical slide holders 4b are attached vertically to the right and left holding members 4a, respectively. Main shafts 4d penetrate hollow portions of the right and left slide holders 4b through bearings 4c in the same manner as in FIG. 2, respectively.

U-shaped wheel supports 4e are mounted to lower ends of the right and left main shafts 4d, respectively. Supported between both plates of the right and left U-shaped wheel supports are wheels 4h which rotate on tracks 4g formed in parallel on upper surfaces of a stationary portion 5 at a floor side, respectively. Disposed on inner upper surfaces of both the plates of the wheel support 4e are guided contact portions 4j which are opposed to guides 4i provided on the stationary portion 5 between the tracks 4g with small gap between the contact portion 4j and the guide 4i. The contact portion 4j utilizes a plate extending in the traveling direction and having small frictional resistance. The plate contains a smooth surface on which a resin layer is applied or provided by adhesive.

[OPERATION OF THE SECOND EMBODIMENT]

With such a structure of the second embodiment, it is apparent that the same operation as that of the first embodiment is attained. It is not necessary to mount the track settling portion 4f and the track 4g on the side surface of the stationary portion 5 and accordingly the cost of construction and installation can be reduced. Furthermore, since the guide mechanism 4 is aligned with the traveling direction and is not on one side with regard to the traveling direction, the balance in suspension is good.

[THE THIRD EMBODIMENT OF THE FIRST INVENTION]

Figure 6:
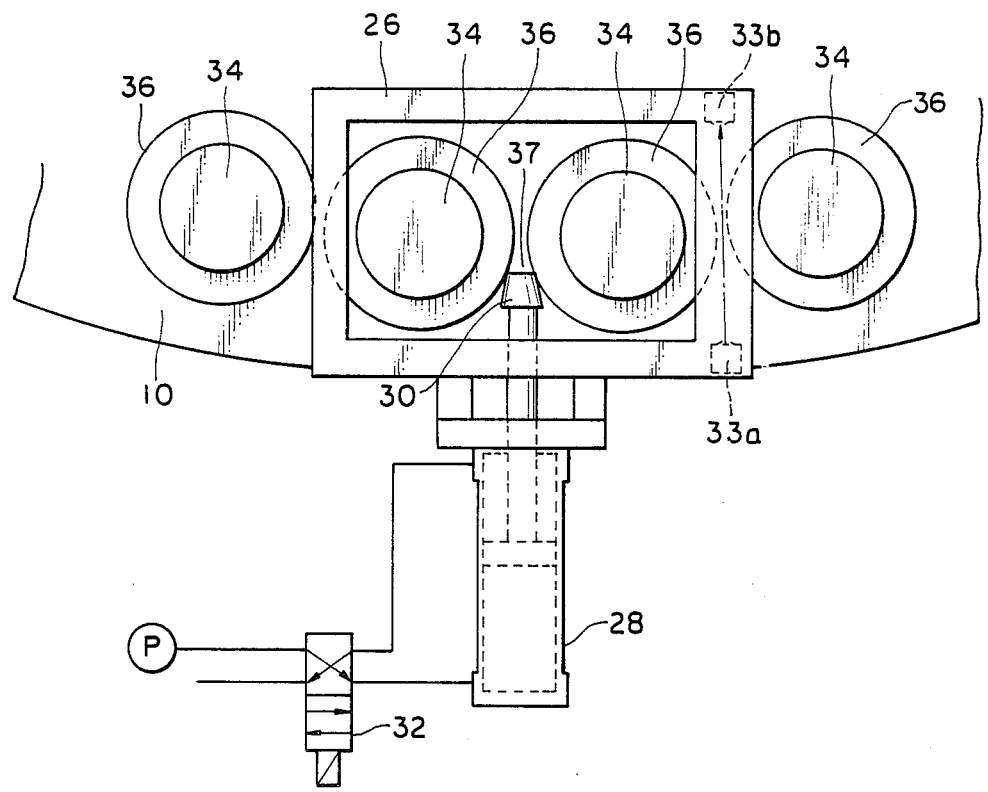
FIG. 6 is a plan view of a positioning guide mechanism.

The embodiment is suitable in the case where a round nut is mounted to a stud to be drawn. As shown in FIGS. 5 to 8, a bolt drawing machine 14 including a pair of positioning guide mechanisms 12 and 12' suspended above a lid 10 of a pressure container is shown. The bolt drawing machine 14 is suspended by a hoist 18 through a wire 16 and the hoist 18 can move in the horizontal direction by the trolley 20. Accordingly, the bolt drawing machine 14 can move in the three dimensional directions. The pair of positioning guide mechanisms 12 and 12' are provided substantially symmetrically in the outer periphery of the bolt drawing machine 14. The positioning guide mechanisms 12 and 12' are identical and accordingly only one of them is described. The positioning guide mechanism 12 comprises a slide holder 22 attached to the bolt drawing mechanism 14, a main shaft 24 guided movably in the vertical direction in the slide holder 22, a guide frame 26 fixed to a lower end of the main shaft 24, a pneumatic cylinder 28 forming an actuator mounted to the guide frame 26, a guide member 30 (refer to FIGS. 6 and 8) mounted to an end of a piston rod of the pneumatic cylinder 28, a directional control valve 32 which controls operation of the pneumatic cylinder 28 and an optical position detector (composed of a light emitter 33a and a photocell 33b). As shown in FIG. 6, the guide member 30 formed substantially into a wedge is formed and disposed so that the member 30 can be fitted into a substantially V-shaped gap 37 formed between round nuts 36 screwed on stud bolts 34 adjacent to each other. Accordingly, the guide member 30 can move between a position where the member 30 is fitted into the gap 37 and a position where the member 30 is outside of the gap 37 by operation of the pneumatic cylinder 28. The light emitter 33a and the photocell 33b of the optical position detector are disposed outside and inside of the circumference, respectively, on which the stud bolts 34 are disposed, as shown in FIG. 6. When the guide member 30 is at the position where the member 30 is opposed to the gap 37, the light emitter 33a and the photocell 34b are disposed so that light emitted from the light emitter 33a to the photocell 33b passes through a gap 37 adjacent to the gap 37 to which the member 30 is opposed. The guide frame 26 is provided with wheels 38 so that the guide frame 26 can easily move on the lid 10 of the pressure container. As described above. The positioning guide mechanism 12 as constructed above and the positioning guide mechanism 12' constructed in the same manner as the mechanism 12 are mounted substantially symmetrically. The mounting position of both the mechanisms 12 and 12' is established so that the central position of the bolt drawing machine 14 is aligned with the central position of a predetermined stud bolt 34 and nut 36 when the guide members 30 and 30' of the pair of guide mechanisms 12 and 12' are fitted into the gaps 37 between the nuts 36, respectively.

Figure 7:
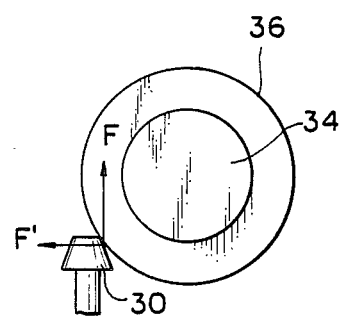
FIG. 7 illustrates force exerting on a guide member.
Figure 8:
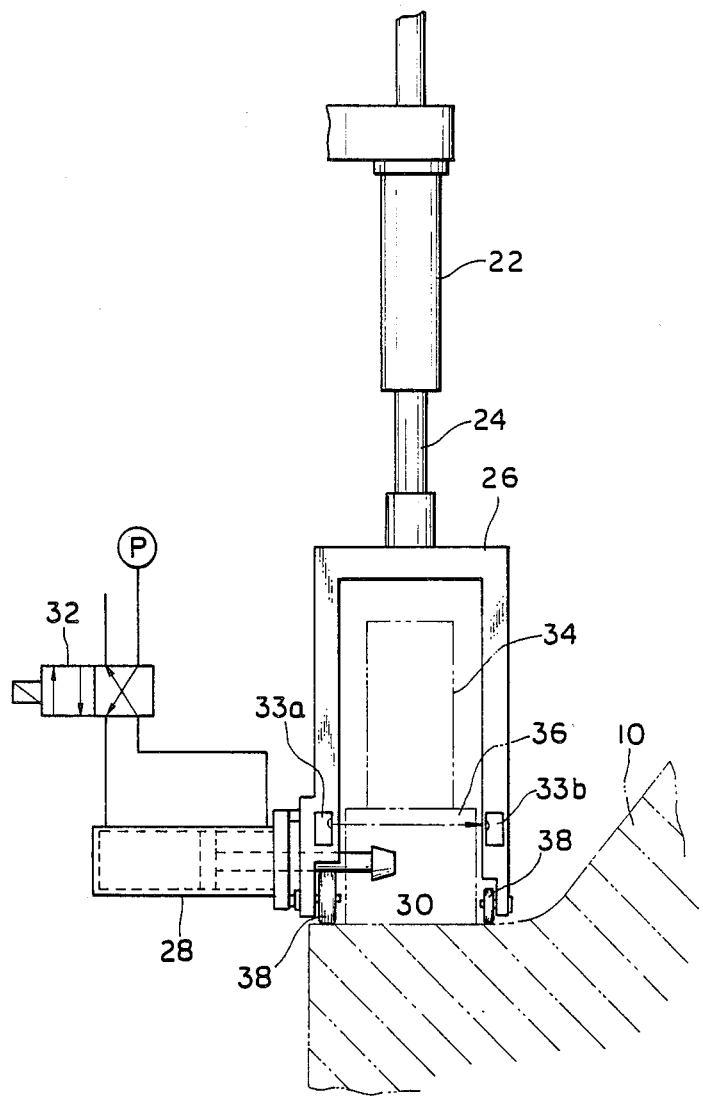
FIG. 8 is a side view of a positioning portion of the guide mechanism.

Operation of the embodiment is now described. The bolt drawing machine 14 is positioned as follows. First of all, the directional control valve 32 is switched to a condition opposite to the condition shown in FIG. 6 to draw in the piston rod of the pneumatic cylinder 28 so that the guide member 30 is positioned outside of the gap 37 formed between the nuts 36. The hoist 18 is then operated to lower the wheels 38 of the guide frame 26 on the lid 10 of the pressure container. (In this state, the bolt drawing machine 14 is positioned above the upper end of the stud bolt 34.) When the trolley 20 is moved in this state, the optical position detector can detect a position of the bolt drawing machine 14 with regard to the stud bolt 34 and the nut 36 of a target. More particularly, each time light emitted from the light emitter 33a passes through the gap 37 between the adjacent nuts 36, the photocell 33b produces a signal. The output signal is counted by the predetermined controller and whether the bolt drawing machine 14 reaches the position of the stud bolt 34 and the nut 36 of a target or not can be recognized. When the bolt drawing machine 14 reaches the position above the stud bolt 34 and the nut 36 of a target, operation of the trolley 20 is stopped and the bolt drawing machine can be stopped at the substantially target position. However, since the bolt drawing machine may not be positioned exactly in this state, the inside of the bolt drawing machine 14 may be in contact with the thread of the stud bolt 34 when the bolt drawing machine 14 is lowered in this state. Accordingly, the positioning guide mechanisms 12 and 12' are operated to position the bolt drawing machine 14 exactly as described above. That is, the directional control valve 32 is first switched to project the piston rod of the pneumatic cylinder 28. If the guide member 30 is not positioned exactly between the two adjacent nuts 36, the guide member 30 comes into contact with one of the two nuts 36 earlier than the other. When the guide member 30 comes into contact with one of the nuts 36, a thrust F of the piston rod produces a component F' of force in the perpendicular direction to the axial direction of the piston rod as shown in FIG. 7. The guide frame 26 is moved by the component F' of force in the direction where the guide member 30 is positioned between the nuts 37. Thus, the guide member 30 (and the other guide member 30' of the other guide mechanism 12') is fitted into the gap 37 between the nuts 36 finally. The forcible movement of the guide frame 26 moves the bolt drawing machine 14 so that the bolt drawing machine comes just above the stud bolt 34 and the nut 36 of a target. An error from the target position at this time can be ±3 mm or less. Accordingly, when the hoist 18 is then operated to lower the bolt drawing machine 14, the bolt drawing machine 14 can reaches the lid 10 of the pressure container without any touch on the stud bolt 34 and the nut 36. The bolt drawing machine 14 then draws the stud bolt 34 and screws the nut 36. Subsequently, the bolt drawing machine 14 is raised by the hoist 18 to attain operation of the next stud bolt 34. Thus, such operation is successively repeated and the lid of the pressure container can be combined by simple operation without occurrence of failure such as damage of the thread of the stud bolt 34. The guide member 30 may be any shape other than the shape shown as far as the guide member can produce the component F' of force when the guide member 30 is brought in contact with the nut 36. Further, while the pneumatic cylinder is used as the actuator for moving the guide member 30, any other electric or oil hydraulic actuator may be used if the guide member 30 can be moved.

EMBODIMENT OF THE SECOND INVENTION

Figure 9A:
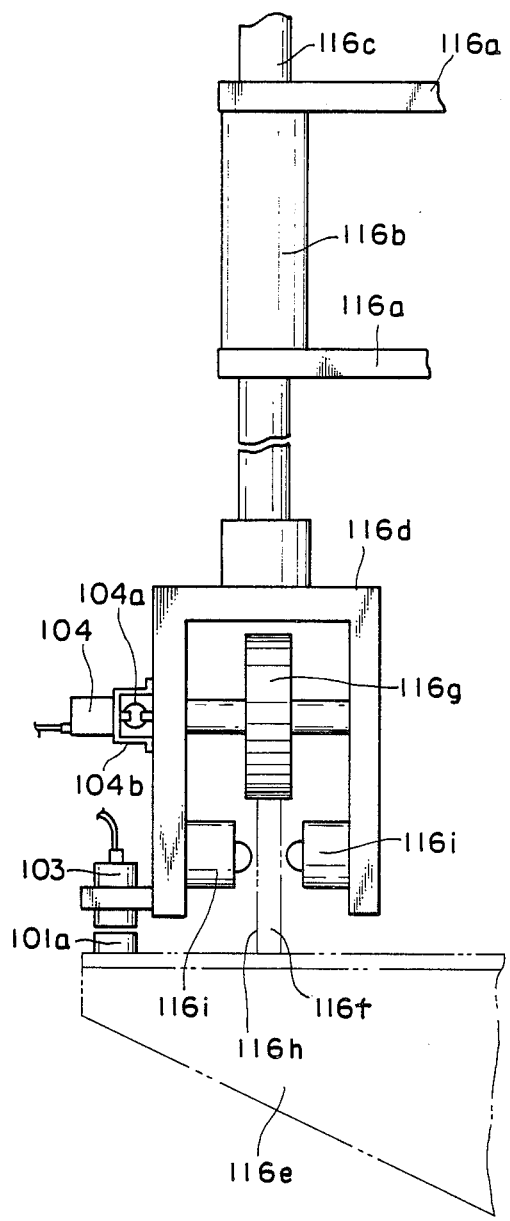
FIG. 9(A) illustrates a structure of a second embodiment of the second invention.
Figure 9B:
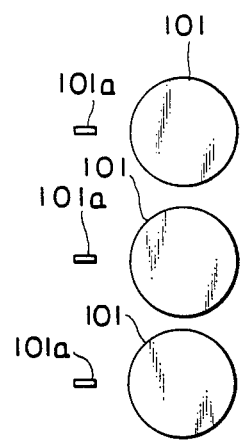
FIG. 9(B) illustrates a position detection relation of the bolt drawing machine.

FIG. 9(A) is a front view of a main portion showing an embodiment of the suspension type transporter according to the present invention, and FIG. 9(B) schematically illustrates the position detection relation of the bolt drawing machine of FIG. 9(A).

Figure 12:
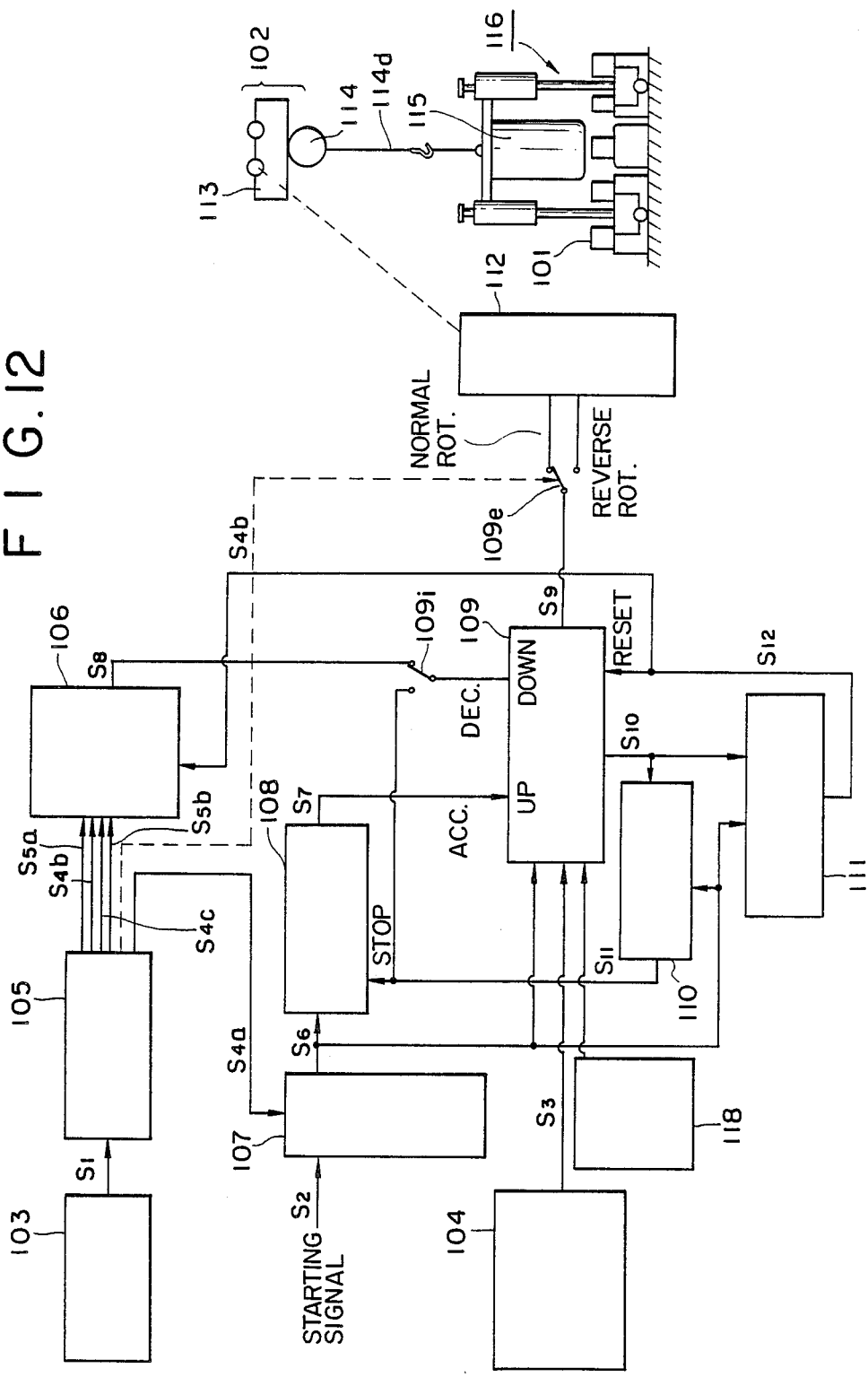
FIG. 12 is a block diagram showing a basic configuration of a controller of the second invention.
Figure 13:
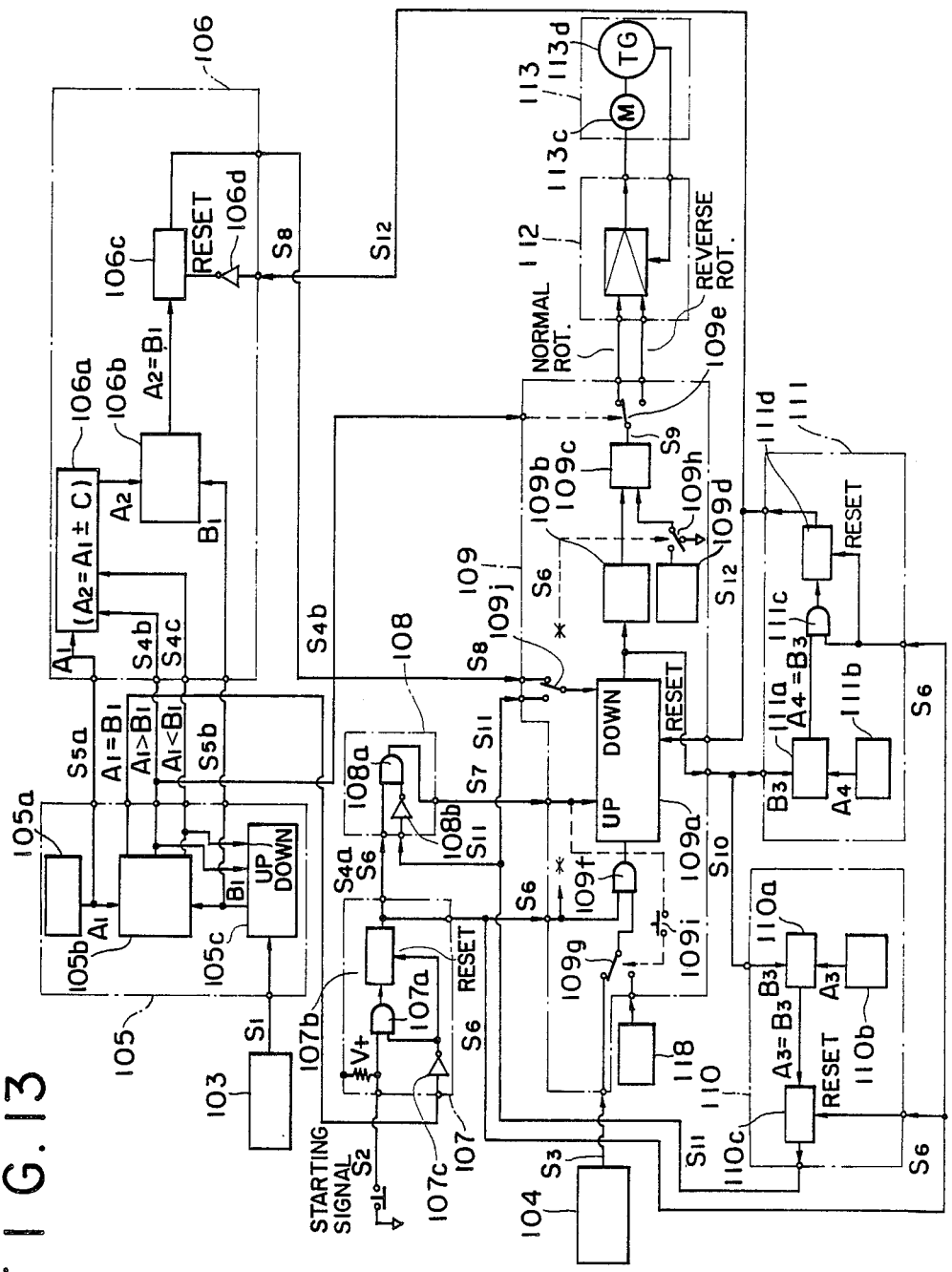
FIG. 13 is a circuit diagram showing a configuration of an embodiment of a controller of the second invention.

FIG. 12 is a block diagram showing a basic configuration of the controller according to the present invention and FIG. 13 is a block diagram showing a configuration of an embodiment of the controller according to the present invention.

Referring to FIG. 12, a trolley 113 and a hoist 114 form a suspension type transporter which suspends an object, for example, a bolt drawing machine 115 through a wire 114d and transports it.

Two pairs of holding members 116a are fixedly mounted to the right and left sides of a drum of the bolt drawing machine 115, respectively, horizontally in the perpendicular direction to the traveling direction as shown in FIG. 9(A). A cylindrical slide holder 116b is vertically mounted between each pair of holding members 116a and a main shaft 116c penetrates a hollow portion of each of the right and left slide holders 116b through a bearing (not shown) movably in the vertical direction and rotatably.

A U-shaped wheel support 116d is attached to a lower end of each of the right and left main shafts 116c. A wheel 116g which rotates on a track 116f of a track settling portion 116e mounted on a side of a stationary portion at the floor side (not shown) is supported between both plates of each of the right and left wheel supports 116d. Guided contact portions 116i are mounted on lower inner surfaces of the plates of the wheel supports 116d, respectively, and the contact portions 116i are opposed to guides 116h formed of both side surfaces of the track 116f, respectively, with small gap between the guide 116h and the contact portion 116i.

The above elements 116a to 116i form a guide mechanism which restricts movement of the bolt drawing machine 115 in the air.

Numeral 101 denotes many stud bolts (and nuts) which are mounted side by side on the stationary portion along the guide 116h, and numeral 101a denotes position detection objects disposed corresponding to a center of the stud bolts 101 on the track settling portion 116e, the number of the position detection objects being equal to the number of the stud bolts (referred to FIG. 9(B) and 12).

Numeral 103 denotes a position detector, that is, a stud bolt detector which detects the position detection object 101a and is mounted on an outer lower surface of one of the plates of the wheel support 116d. The stud bolt detector 103 detects the position of the stud bolt 101 by detecting the position detection object 101a and utilizes a proximity switch.

Numeral 104 denotes a continuous moving distance detector which is coupled with a shaft of the wheel 116g through a coupling 104a and is mounted to the wheel support 116e through a mounting base frame 104b. The continuous moving distance detector 104 can use, for example, a rotary encoder.

FIG. 10(A) is a front view of a portion showing another example of the suspension type transporter according to the present invention, and FIG. 10(B) schematically illustrates a position detection relation of the bolt drawing machine in FIG. 10(A).

In this example, the holding members 116a are fixedly mounted to the right and left sides of the top of the bolt drawing machine 115 horizontally in the traveling direction. The track 116f is formed in parallel with the upper surface of the stationary portion 117, and the many stud bolts 101 having the function of a guide are disposed in a line on the stationary portion 117 between the tracks 116.

The stud bolt detector 103 uses an optical sensor, and a light emitter 103a and a photocell 103b forming the optical sensor are attached to both the plates of the wheel support 116d so that the light emitter and the photocell are opposed to each other and emitting and receiving of light between the light emitter and the photocell can be attained through between the two adjacent stud bolts 101 (refer to FIG. 10(B)). In this example, the stud bolts 101 form the position detection objects.

In FIGS. 12 and 13, a stud bolt detector 103 produces one pulse each time the detector crosses the position detection object 101a or the stud bolt 101 (position detection object). In the case of the stud bolt detector 103 of FIG. 9(A), there is no problem while it seems that the stud bolt detector 103 does not produce an output pulse when the detector crosses the center of one stud bolt 101 as shown in FIG. 11(B). That is, since an object to be positioned is the bolt drawing machine 115 in the present embodiment and the optical sensor is disposed in a position where the optical sensor produces its output signal when the bolt drawing machine 115 is in relative positional relationship with the position of the stud bolt 101, it can be considered that the stud bolt detector 103 produces the output at the same timing as in FIG. 11(B) functionally.

A transit discrimination circuit 105 comprises a stud number counter 105c which is supplied with an output $S_1$ of the stud bolt detector 103 and counts the number of the stud bolts to produce a signal $S_{5b}$ of the counted number $B_1$ (present position signal), a transit number controller 105a which sets a transit number and produces a signal $S_{5a}$ of the transit number $A_1$ (target position signal), and a digital comparator 105b which compares the inputted number signal $S_{5b}$ and transit number signal $S_{5a}$ to produce a signal $S_{4a}$ of $A_1 = B_1$, a signal $S_{4b}$ of $A_1 > B_1$ and a signal $S_{4c}$ of $A_1 < B_1$.

FIG. 14 is an actual circuit diagram of the transit discrimination circuit 105, which designates the number of the first to ninth stud bolts 101. The transit number controller 105a comprises switches $SW_1$ to $SW_4$ and diodes $D_1$ to $D_4$. The digital comparator 105b uses a digital comparator IC and the stud number counter 105c uses a BCD up-down counter IC. A NOT element 105d, a resistor R and a condenser C form an initial reset circuit of the counter IC.

A deceleration command circuit 106 comprises an adder-subtracter 106a which is supplied with the signal $S_{5a}$ of the transit number $A_1$ and the signal $S_{4b}$ of $A_1 > B_1$ or the signal $S_{4c}$ of $A_1 < B_1$ to subtract or add a prescribed value C from or to the value of $A_1$ and produces a signal of $A_2 = A_1 + C$ or $A_1 - C$, a digital comparator 106b which is supplied with the output signal $A_2$ and the signal of the number $B_1$ and produces a coincident signal $A_2 = B_1$ when both the signals are coincident, a hold circuit 106c which is supplied with the output of the digital comparator 106b and produces a deceleration command signal $S_8$, and a NOT element 106d which is supplied with a deceleration finish signal $S_{12}$ and produces an output signal which resets the hold circuit 106c.

Figure 15:
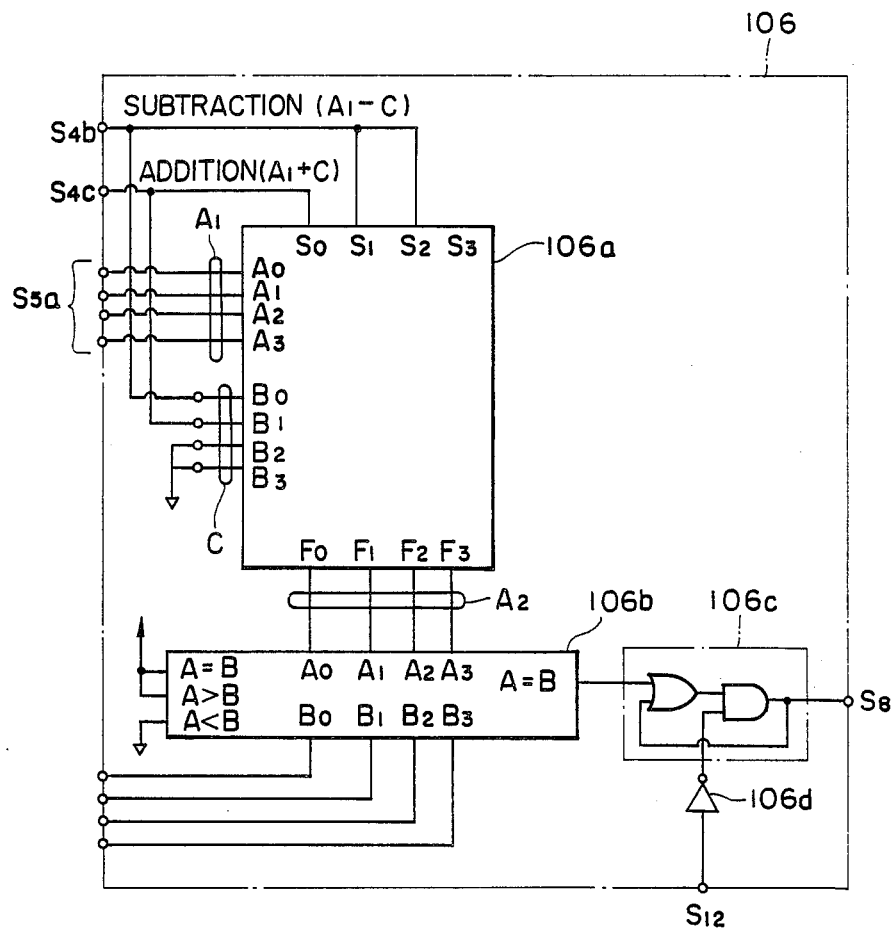
FIG. 15 is an actual circuit diagram showing a deceleration command circuit in the second invention.
Figure 16:
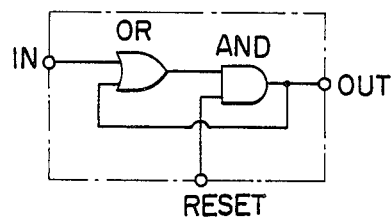
FIG. 16 is an actual circuit diagram showing a hold circuit in the second invention.

FIG. 15 is an actual circuit diagram of the deceleration command circuit 106. The adder-substracter 106a uses a 4-bit arithmetic logic unit and the digital comparator 106b uses a digital comparator IC. The hold circuit 106c is composed of an AND element and an OR element as shown in FIG. 16.

An operation command circuit 107 comprises a NOT element 107c which is supplied with the signal $S_{4a}$ of $A_1 = B_1$ and produces a signal of $A_1 \neq B_1$, an AND element 107a which is supplied with the output of the NOT element 107c and a start signal $S_2$, and a hold circuit 107b which is supplied with an output of the AND element 107a to produce an operation command signal $S_6$ and is reset by the signal of $A_1=B_1$. The hold circuit 107b can use the circuit shown in FIG. 16.

An acceleration command circuit 108 comprises a NOT element 108b which is supplied with an acceleration stop signal $S_{11}$ and an AND element 108a which is supplied with an output of the NOT element 108b and the operation command signal $S_6$ and produces an acceleration command signal $S_7$.

The continuous moving distance detector 104 detects the moving distance of the bolt drawing machine 115 to produce a pulse train $S_3$ having a very narrow pitch as shown in FIG. 11(C). A pulse generator 118 produces a pulse train corresponding to the moving distance of bolt drawing machine 115.

A velocity pattern programming circuit 109 comprises an AND element 109f which is supplied with the operation command signal $S_6$ and the pulse train from the continuous moving distance detector 104 or an pulse oscillator 118, a counter 109a which is supplied with an output of the AND element 109f to integrate the output of the AND element 109f (the pulse train corresponding to the moving distance) while the acceleration command signal $S_7$ is supplied, that is, until the integrated value of the counter reaches a set point of acceleration stop and to reduce the value integrated during acceleration while the deceleration command signal $S_8$ is supplied, that is, until the reduced value of the counter reaches a set point of deceleration stop, a digital-analog (D/A) converter circuit 109b which converts an output of the counter 109a into an analog signal, an adder 109c which is supplied with an output of the converter circuit 109b and an output of a slow speed controller 109d and produces an acceleration-deceleration pattern program speed signal $S_9$ in the form of trapezoid or triangle, a selector switch (relay) 109g for switching the output of the continuous moving distance detector 104 or the pulse oscillator 118 to supply it to one input terminal of the AND element 109f, an operator switch 109i for switching the selector switch 109g in response to the acceleration command signal $S_7$, a selector switch (relay) 109h which operates in response to the operation command signal $S_6$ to switch an output of the slow speed controller 109d to supply it to one input terminal of the adder 109c, and a selector switch (relay) 109e which operates in response to the signal $S_{4b}$ of $A_1>B_1$ to supply an output $S_9$ of the adder 109c to a non-inverted or inverted input of a controller 112 for a variable speed motor.

The acceleration stop signal $S_{11}$ may be supplied as the deceleration command signal to the counter 109a through the selector switch 109j.

Figure 17:
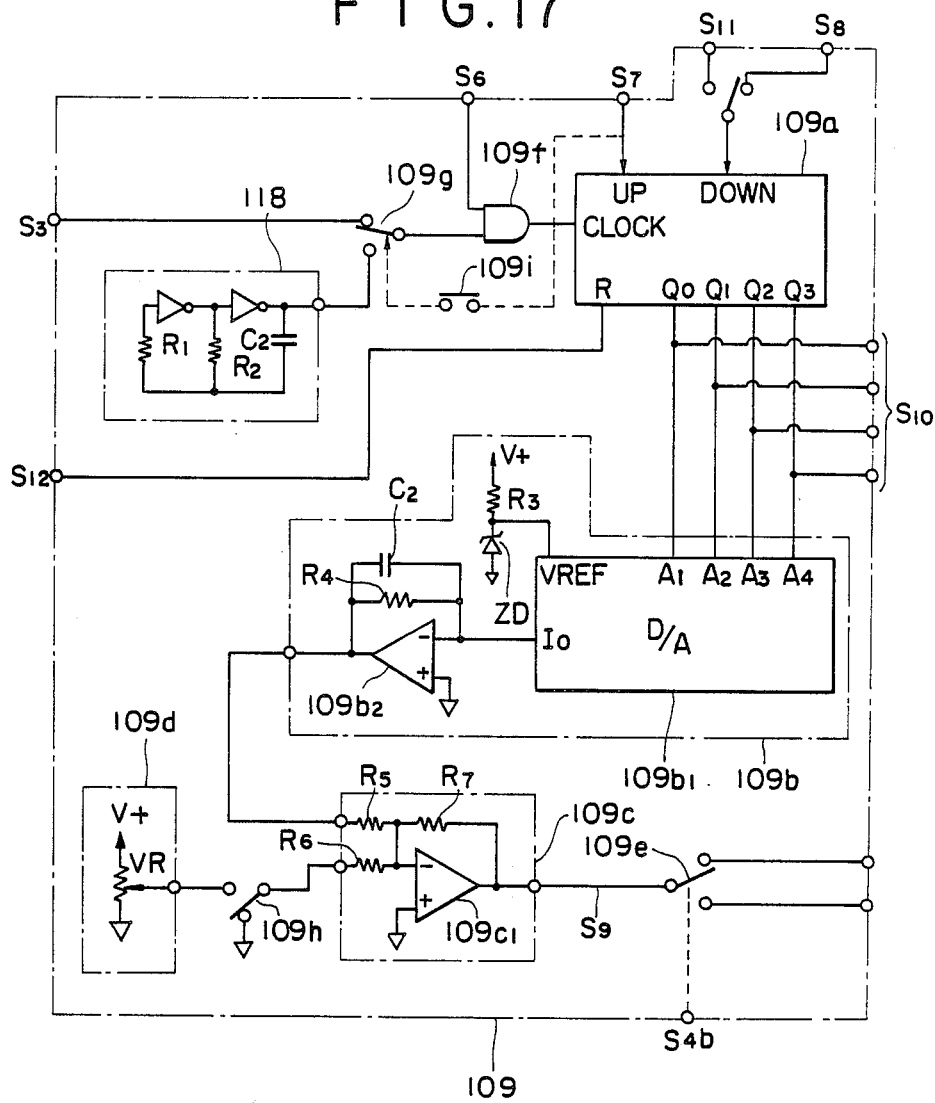
FIG. 17 is an actual circuit diagram showing a velocity pattern programming circuit in the second invention.

FIG. 17 is an actual circuit diagram of the velocity pattern programming circuit 109.

The counter 109a uses a BCD up-down counter IC. The D/A converter circuit 109b comprises a current-output type D/A converter 109$_1$, an operational amplifier 109$b_2$, resistors $R_3$ and $R_4$, and a condenser $C_2$. The adder 109c comprises an operational amplifier 109c and resistors $R_5$ to $R_7$. The slow speed controller 109d uses a variable resistor VR.

An acceleration stop command circuit 110 comprises an acceleration stop controller 110b, a digital comparator 110a which is supplied with a set signal $A_3$ of acceleration stop and an output $S_{10}$ (integrated value $B_3$ of continuous moving distance) of the counter 109a to compare them and produces a position signal $A_3=B_3$ when both signals are coincident, and a hold circuit 110c which is supplied with an output of the comparator 110a to produce an acceleration stop signal $S_{11}$ and is reset by the operation command signal $S_6$ having 0 level.

Figure 18:
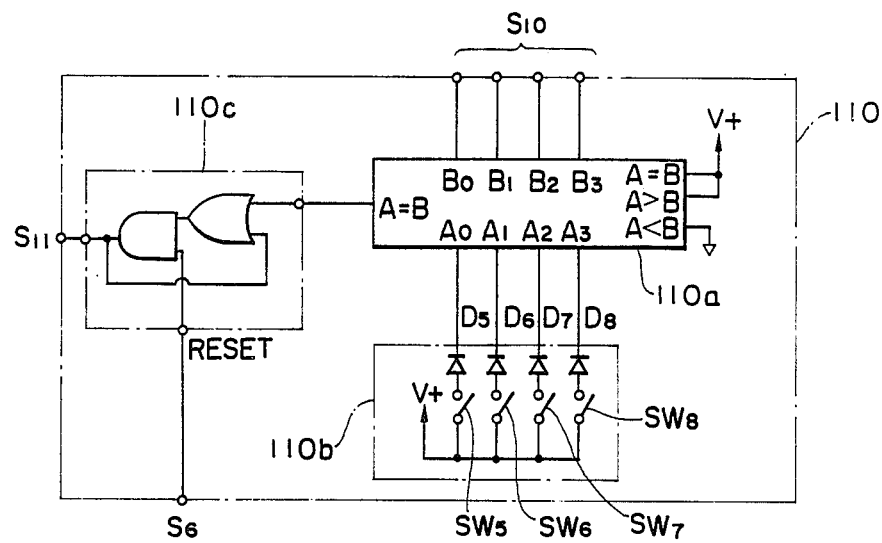
FIG. 18 is an actual circuit diagram showing an acceleration stop command circuit in the second invention.

FIG. 18 is an actual circuit diagram of the acceleration stop command circuit 110.

The digital comparator 110a uses a digital comparator IC and the hold circuit 110c may use the circuit of FIG. 16. The acceleration stop controller 110b comprises switches $SW_5$ to $SW_8$ and diodes $D_5$ to $D_8$.

A deceleration finish detector circuit 111 comprises a zero-set controller 111b which sets a set signal $A_4$ of deceleration finish, a digital comparator 111a which is supplied with the set signal $A_4$ and the output $S_{10}$ (integrated value $B_3$ of continuous moving distance) of the counter 109a and compares them to produce a coincidence signal $A_4=B_3$ when both signals are coincident, an AND element 111c which is supplied with the coincident signal $A_4=B_3$ and the operation command signal $S_6$, and a hold circuit 111d which is supplied with an output of the AND element 111c to produce the deceleration finish signal $S_{12}$ and is reset by the operation command signal $S_6$ having 0 level.

Figure 19:
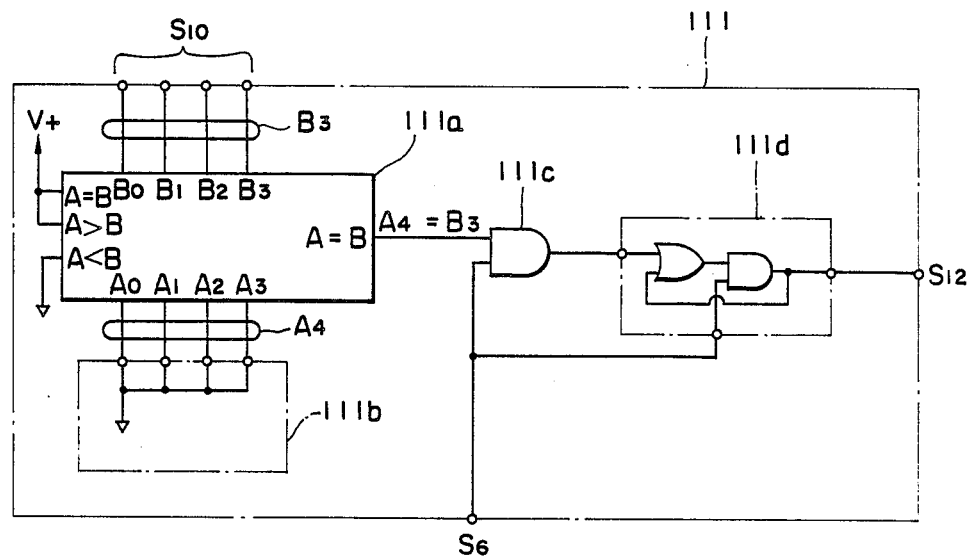
FIG. 19 is an actual circuit diagram showing a deceleration finish detector circuit in the second invention.

FIG. 19 is an actual circuit diagram of the deceleration finish detector circuit 111.

The digital comparator 111a uses a digital comparator IC and the hold circuit 111d uses the circuit of FIG. 16. The zero-set controller 111b is formed of a circuit which connects all of input terminals $A_0$ to $A_3$ of the digital comparator 111a to 0 level.

The controller 112 of a variable speed motor is supplied with the output $S_9$ of the adder 109c to the non-inverted input or the inverted input thereof to rotate the variable speed motor 113c unreversely or reversely and controls the speed of the motor 113c in accordance with the velocity pattern program. The controller 112 is formed of, for example, a motor control amplifier and includes a feedback circuit through a tachometer generator 113d.

OPERATION OF THE EMBODIMENT

Operation is now described. In the initial state, the suspension type transporter is positioned so that the bolt drawing machine 115 is opposed to the first stud bolt shown in FIG. 11 and is to transport the bolt drawing machine 115 from the starting point (initial position) where the machine 115 is opposed to the first stud bolt to the target position, for example, the nth stud bolt position. In this case, the transit number $A_1$ is set to n, that is, $A_1=n$ by the transit number controller 105a.

The stud bolt detector 103 detects the first position and produces the pulse $S_1$. The stud number counter 105c is supplied with the output pulse $S_1$ and counts the number (No. 1) of the stud bolt. The digital comparator 105b compares the signal of the number $B_1$ (No. 1) with the signal of the transit number $A_1=n$ and produces the signal of $A_1=B_1$, $A_1>B_1$ or $A_1<B_1$ as the comparison result.

When the signal $S_{4a}$ of $A_1=B_1$ is applied to the NOT element 107c of the operation command circuit 107, the output of the NOT element 107c becomes 0 level, while when the signal $S_{4a}$ is not applied to the NOT element 107c, the output of the NOT element 107c becomes 1 level (where all logics are handled in positive logic in the present invention). Accordingly, when the comparison result is $A_1>B_1$ and $A_1 \neq B_1$, the output of the NOT element 107c is 1 level.

Since the start signal $S_2$ and the output of the NOT element 107c which are both 1 level are supplied to the two inputs of the AND element 107a, the output of the AND element 107a is 1 level and is applied to the hold circuit 107b. Since the output of the NOT element 107c is 1 level, the hold circuit 107b is in the set wait state. Accordingly, when the output of the AND element 107a is 1 level, the hold circuit 107b produces 1 level and the output of the hold circuit 107b is maintained to 1 level to produce it as the operation command signal $S_6$ until the output of the NOT element 107c is 0 level and the hold circuit 107b is reset.

The operation command signal $S_6$ switches the selector switch 109h of the velocity pattern programming circuit 109 so that the set signal (analog voltage signal) of slow speed which is established by the slow speed controller 109d is applied to the adder 109c. The adder 109c produces the set signal of slow speed which is applied to the motor control amplifier 112 through the selector switch 109e which is switched to the non-inverted input side of the amplifier 112 by the signal of $A_1 > B_1$ produced from the digital comparator 105b of the transit discrimination circuit 105. Thus, the variable speed motor 113c of the trolley 113 is rotated at slow speed and the output of the tachometer generator 113d is applied to the motor control amplifier 112 as the feedback signal to form a closed loop of the motor control. Accordingly, the trolley 113, that is, the suspension type transporter 102 starts to move at the initial speed of Vo shown in the vertical axis of FIG. 11(A).

When the suspension type transporter 102 is moved and hence the suspended bolt drawing machine 115 is moved, force in the traveling direction is transmitted to the main shaft 116d through the holding member 116a and the slide holder 116b to rotate the wheel 116g. Accordingly, the guide mechanism 116 is moved on the track 116f together with the bolt drawing machine 115 through the wheel support 116d.

The continuous moving distance detector 104 detects the moving distance of the guide mechanism 116 and produces the pulse train $S_3$ corresponding to the moving distance. Since the operation command signal $S_6$ having 1 level is applied to the AND element 109f of the velocity pattern programming circuit 109, the output pulse train $S_3$ of the continuous moving distance detector 104 applied to the AND element 109f through the selector switch 109g is applied to the counter 109a.

On the other hand, the operation command signal $S_6$ is applied to the AND element 108a of the acceleration command circuit 108. At this time, the acceleration stop signal $S_{11}$ is maintained 0 level and accordingly the output of the NOT element 108b is 1 level. Accordingly, since two inputs of the AND element 108a are both 1 level, the AND element 108a produces an output of 1 level which is applied to the up count terminal of the counter 109a as the acceleration command signal $S_7$.

The deceleration finish signal $S_{12}$ is 0 level, which is applied to the reset terminal of the counter 109a. Accordingly, the counter 109a starts to count the output pulse train of the AND element 109f (output pulse train of the continuous moving distance detector 104). Thus, the counter 109a integrates the output pulse train of the continuous moving distance detector 104 in the up-count mode and the integrated value is supplied to the D/A converter circuit 109b to be converted into the analog signal.

The adder 109c is supplied with the analog signal of the converter circuit 109b and the output of the slow speed controller 109d to add them and produces the speed signal shown by the rightward ascending inclination in the left side of the velocity pattern of FIG. 11(A). Since the produced speed signal is obtained by converting the digital signal to the analog signal, the speed signal is stepwise in detail as shown in a circle of of FIG. 11(D). However, since the resolution is set to be sufficiently small, the suspension type transporter is not operated stepwise.

The digital comparator 110a of the acceleration stop command circuit 110 is supplied with the output (integrated value of the continuous moving distance) of the counter 109a and the output $A_3$ of the acceleration stop controller 110b to compare them and produces the coincident signal $A_3 = B_3$ when both of them are coincident. The coincident signal is applied to the hold circuit 110c. Since the operation command signal $S_6$ is 1 level which is applied to the reset terminal of the hold circuit 110c which is reset when the reset terminal thereof is supplied with 0 level, the output of the hold circuit 110c becomes 1 level in response to the coincident signal $A_3 = B_3$. Thus, the output of the hold circuit 110c is maintained 1 level which is produced as the acceleration stop signal $S_{11}$ until 0 level is applied to the reset terminal of the hold circuit 110c to reset the hold circuit 110c.

The acceleration stop signal $S_{11}$ is applied to the NOT element 108b of the acceleration command circuit 108 and the output of the NOT element 108b becomes 0 level. Accordingly, the output of the AND element 108a becomes 0 level and the acceleration command signal becomes 0 level. The up-count mode of the counter 109a is hence released to stop the integration operation.

As described above, in the initial state, the transporter 102, the bolt drawing machine 115 and the guide mechanism 116 (hereinafter referred to as the transporter 102 and others) are moved at the initial speed Vo (refer to FIG. 11) given by the slow speed controller 109d. Subsequently, the rotary encoder forming the continuous moving distance detector 104 starts its rotation and the output pulses of the rotary encoder are integrated so that the traveling speed is gradually increased. However, the increase of the speed can be prevented by prescribing the number of integrated pulses, and the correspondence relation between the speed and the moving distance during acceleration can be obtained (refer to FIG. 11).

The relation can be realized by employing the pulse oscillator 118 in place of the continuous moving distance detector 104 and applying the output pulse of the pulse oscillator 118 to the counter 109a. In this case, when the switch 109i is closed, the selector switch 109g is switched by the acceleration command signal $S_7$ of 1 level to connect the pulse oscillator 118 to the AND element 109f so that the output pulse of the pulse oscillator 118 is applied to the counter 109a through the AND element 109f. Thus, the speed can be gradually increased by integrating the pulses in accordance with the moving distance, and further the increase of the speed can be stopped by prescribing the number of the integrated pulses in the same manner as above. When the pulse oscillator 118 is used, the inclined angle in acceleration of the velocity pattern shown in FIG. 11(A) can be adjusted in accordance with inertial load of the system by varying the frequency of the oscillator.

After the acceleration is stopped, the counter 109a does not perform the integration and accordingly the transporter 102 and others travel at constant speed Vc shown in the middle of FIG. 11(A).

Description is now made to operation that the transporter 102 and others start the deceleration and stops at the target position when the transporter 102 and others reach the deceleration start position near the target position.

Figure 11:
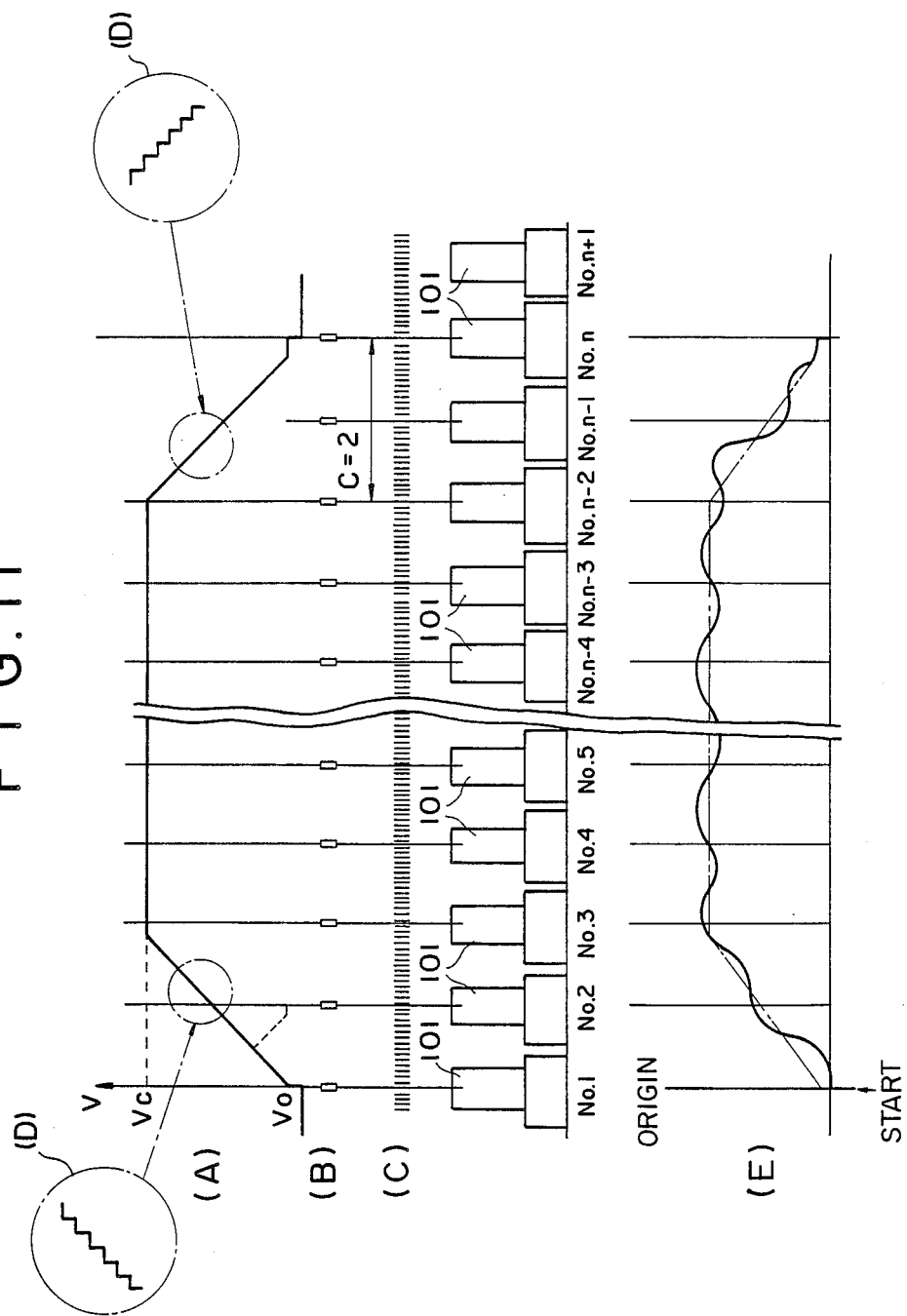
FIG. 11 illustrates operation of a controller of the second invention.

The adder-subtracter 106a of the deceleration command circuit 106 is supplied with the output $A_1$ of the transit number controller 106a of the transit discrimination circuit 105 and the signal $A_{4b}$ of $A_1 > B_1$ or the signal $S_{4c}$ of $A_1 < B_1$ which is the output of the digital comparator 105b and subtracts or add the prescribed value C from or to the value $A_1$. The prescribed value C is a number of stud bolts for determining the starting position of the deceleration and the deceleration is started from a stud bolt which is placed before the nth stud bolt by the number of stud bolts determined by the value C. In FIG. 11, since the deceleration is started from the (n−2)th stud bolt, the prescribed value C is 2, that is, C=2. Determination of the prescribed value C is important.

The acceleration stop command circuit 110 compares the output (number of integrated pulses) $B_3$ of the counter 109a and the number of pulses corresponding to the value $A_3$ set by the acceleration stop controller 110b. When $A_3 = B_3$, the integration operation of the counter 109a is stopped so that the speed is increased from Vo to Vc. In other words, by integrating the number of pulses corresponding to the value $A_3$ set by the acceleration stop controller 110b, the speed is increased from Vo to Vc. Accordingly, if the speed is reduced from Vc to Vo reversely, the transporter 102 and others may be moved by the number of pulses set by the acceleration stop controller 110b so that the pulses may be obtained from the continuous moving distance detector 104. That is, the number of pulses integrated by the counter 109a in acceleration may be reduced in deceleration. Accordingly, the value C is the number of spaces between the stud bolts in minimum corresponding to the moving distance corresponding to the set value of the acceleration stop controller 110b. It would be noted that the set value of the acceleration stop controller 110b is desirably determined so that the moving distance at the low speed Vo is minimized as short as possible.

The adder-subtracter 106a produces the output of $A_2 = A_1 + C$ or $A_2 = A_1 - C$ in accordance with the value C thus determined. The digital comparator 106b compares the output $A_2$ and the output $B_1$ of the stud number counter 105c and produces the coincident signal $A_2 = B_1$ to supply the coincident signal to the hold circuit 106c. The hold circuit 106c is reset when the signal of 0 level is supplied to the reset terminal of the hold circuit 106c. At this time, since the deceleration finish signal $S_{12}$ is 0 level, the output of the NOT element 106d is 1 level. Accordingly, the hold circuit 106c supplied with the signal $A_1 = B_1$ maintains its output to 1 level to produce the output as the deceleration command signal $S_8$.

Since the deceleration command signal $S_8$ is supplied to the down-count mode terminal of the counter 109a through the selector switch 109j, the number of integrated pulses held in the counter 109a is reduced in response to the output pulse of the continuous moving distance detector 104 or the pulse oscillator 118 after the transporter 102 and others pass through the stud bolt which is placed before the nth stud bolt of target by the number C of stud bolts. The velocity pattern at this time is represented by the inclination at the right end of the velocity pattern of FIG. 11(A).

When the integrated value of the counter 109a is reduced to zero, the output of the D/A converter 109b becomes zero. Accordingly, the output of the adder 109c is only the output of the slow speed controller 109d and the velocity of the transporter 102 and others is equal to Vo. The digital comparator 111a of the deceleration finish detector circuit 111 compares the output $B_3$ of the counter 109a and the output (digital signal of zero value) $A_4$ of the zero-set controller 111b and produces the coincident signal $A_4 = B_3$ when the output value of the counter 109a becomes zero and both the input values are coincident. The AND element 111c is supplied with the output $A_4 = B_3$ and the operation command signal $S_6$ of 1 level and produces the output signal of 1 level. The hold circuit 111d is reset when a signal of 0 level is supplied to the reset terminal thereof. Since the reset terminal of the hold circuit 111d is now supplied with the operation command signal $S_6$ of 1 level, the hold circuit 111d is not reset. The hold circuit 111d is supplied with the 1 level output signal of the AND element 111c and maintains its output to 1 level to produce the output as the deceleration finish signal $S_{12}$.

The deceleration finish signal $S_{12}$ is supplied to the reset terminal of the counter 109a (which is reset by a signal of 1 level). The counter 109a is reset and is held to the reset state. The deceleration finish signal $S_{12}$ is also supplied to the reset terminal of the hold circuit 106c of the deceleration command circuit 106 through the NOT element 106d and resets the hold circuit 106c. The hold circuit 106c releases the deceleration command signal $S_6$ of 1 level and produces the output of 0 level.

Subsequently, the transporter 102 and others moves at the slow speed Vo. When the transporter 102 and others reach the nth stud bolt of target position, the output value of the stud number counter 105c counting the output pulses of the stud bolt detector 103 is equal to the value of n which is equal to the output value $A_1 = n$ of the transit number controller 105a. Accordingly, the digital comparator 105b produces the coincident signal $A_1 = B_1$ ($S_{4a}$).

The coincident signal $A_1 = B_1$ is supplied to the NOT element 107c of the operation command circuit 107 and the output of the NOT element 107c becomes 0 level. The output of the NOT element 107c is applied to the reset terminal of the hold circuit 107b to reset the hold circuit 107b. Accordingly, the hold circuit 107b releases the operation command signal $S_6$ of 1 level and produces the output of 0 level.

The 0 level output of the hold circuit 107b resets the hold circuit 110c of the acceleration command circuit 110 and the hold circuit 111d of the deceleration finish detector circuit 111. The output of the AND element 109f of the velocity pattern programming circuit 109 becomes 0 level irrespective of the state of the other input and does not apply any pulse to the counter 109a. The selector switch 109h is switched to disconnect the adder 109c from the slow speed controller 109d.

Since the selector switch 109h is switched and the output of the slow speed controller 109d producing the output of the slow speed Vo is not applied to the adder 109c, the transporter 102 and others are stopped at the target stud bolt position in accordance with the velocity pattern of FIG. 11(A).

The control described above is attained in accordance with the velocity pattern in the form of trapezoid, while the control is impossible theoretically when the deceleration start position does not correspond to the stud bolt. Accordingly, when it is desired that the transporter is moved to the adjacent stud bolt position, for example, from the first stud bolt to the second stud bolt as shown by the velocity pattern of broken line of FIG. 11(A), the velocity pattern must be triangular unlike the velocity pattern in the form of trapezoid. The velocity pattern in the form of triangle can be attained only by switching the selector switch 109j of the velocity pattern programming circuit 109 of FIG. 13 to the input side of the acceleration stop signal $S_{11}$.

In the case, the output value $A_3$ of the acceleration stop controller 110b of the acceleration stop command circuit 110 is set to a value which is a little smaller than a half of one interval between the stud bolts. Thus, the acceleration is stopped at that position and at the same time the deceleration is started. Operation of each portion is the same as that in the velocity pattern in the form of trapezoid.

Thus, the velocity pattern in the form of trapezoid or triangle in FIG. 11(A) is formed and the speed of the transporter 102 and others are controlled in accordance with the velocity pattern.

While operation of the hoist 114 is not described above, the hoist merely performs simple operation such as ascent and descent in a manner not shown before the trolley 113 starts to move and after the trolley 113 has moved in accordance with the velocity pattern of FIG. 11(A). Restriction for ascent and descent at this time may be attained by a signal of a proximity switch which is mounted so that the switch detects relative position of the main shaft 116c and the slide holder 116b of the guide mechanism 116, while not shown. Thus, it is not required that the hoist 114 includes function of detecting the position for ascent and descent.

Operation of the guide mechanism 116 is now described. The guide mechanism 116 moves together with the bolt drawing machine 115. In this case, since movement of the bolt drawing machine in the lateral direction is restricted by the guide 116h and the guided contact portion 116i, twist of the suspending wire and rolling of the bolt drawing machine 115 can be prevented irrespective of traveling on the straight line and the curved line.

The present invention is not limited to the case where the bolt drawing machine is suspended and be transported to the target stud bolt position, but can be widely applied to the case where an object is suspended to be transported to a target position.

Generally, as be readily understood from FIG. 9(A), the suspended object can be transported to the target position by attaining the positioning of the suspended object by the many position detection objects 101a and position detectors 103 placed side by side, determining the target position to one of the position detection objects 101a and configuring the controller as shown in FIG. 12.

(EMBODIMENT OF THE THIRD INVENTION)

A circuit diagram showing a basic configuration of a controller according to the present invention is the same as FIG. 12 for the embodiment of the second invention, and FIG. 20 is a circuit diagram showing a configuration of an embodiment of the controller according to the present invention.

Referring to FIG. 20, the stud bolt detector 103 produces one pulse each time the detector crosses the position detection object 101a and the stud bolt 101 (position detection object). In the case of the stud bolt detector 103 (103a and 103b) of FIG. 10, there is no problem while it seems that the output pulse of the stud bolt detector 103 is not issued when crossing the center of one stud bolt 101. That is, in the present embodiment, the object to be positioned is the bolt drawing machine 115, and since an optical sensor is disposed in a position where the optical sensor produces its output when the bolt drawing machine 115 is in relative positional relationship with the position of the stud bolt 101, it can be regarded that the stud bolt detector 103 produces its output in the same timing as that of FIG. 11(B) functionally.

A transit discrimination circuit 105 comprises a stud number counter 105c which is supplied with an output $S_1$ of the stud bolt detector 103 and counts the number of the stud bolts to produce a signal $S_{5b}$ of the counted number $B_1$ (present position signal), a transit number controller 105a which sets a transit number and produces a signal $S_{5a}$ of the transit number $A_1$ (target position signal), and a digital comparator 105b which compares the inputted current number signal $S_{5b}$ and transit number signal $S_{5a}$ to produce a signal $S_{4a}$ of $A_1=B_1$, a signal $S_{4b}$ of $A_1>B_1$ and a signal $S_{4c}$ of $A_1<B_1$.

A declaration command circuit 106 comprises an adder-subtracter 106a which is supplied with the signal $S_{5a}$ of the transit number $A_1$ and the signal $S_{4b}$ of $A_1>B_1$ or the signal $S_{4c}$ of $A_1<B_1$ to subtract or add a prescribed value C from or to the value of $A_1$ and produces a signal of $A_2=A_1+C$ or $A_1-C$, a digital comparator 106b which is supplied with the output signal $A_2$ and the signal of the number $B_1$ and produces a coincident signal $A_2=B_1$ when both the signals are coincident, a hold circuit 106c which is supplied with the output of the digital comparator 106b and produces a deceleration command signal $S_8$, and a NOT element 106d which is supplied with a deceleration finish signal $S_{12}$ and produces an output signal which resets the hold circuit 106c.

An operation command circuit 107 comprises a NOT element 107c which is supplied with the signal $S_{4a}$ of $A_1=B_1$ and produces a signal of $A_1 \neq B_1$, an AND element 107a which is supplied with the output of the NOT element 107c and a start signal $S_2$, and a hold circuit 107b which is supplied with an output of the AND element 107a to produce an operation command signal $S_6$ and is reset by the signal of $A_1=B_1$. The hold circuit 107b can use the circuit shown in FIG. 16.

An acceleration command circuit 108 comprises a NOT element 108b which is supplied with an acceleration stop signal $S_{11}$ and an AND element 108a which is supplied with an output of the NOT element 108b and the operation command signal $S_6$ and produces an acceleration command signal $S_7$.

The continuous moving distance detector 104 detects the moving distance of the bolt drawing machine 115 to produce a pulse train $S_3$ having a very narrow pitch as shown in FIG. 11(C). A pulse generator 118 produces a pulse train corresponding to the moving distance of bolt drawing machine 115.

A velocity-acceleration pattern programming circuit 109 comprises an AND element 109f which is supplied with the operation command signal $S_6$ and the pulse train from the continuous moving distance detector 104 or an pulse oscillator 118, a counter 109a which is supplied with an output of the AND element 109f to integrate the output of the AND element 109f (the pulse train corresponding to the moving distance) while the acceleration command signal $S_7$ is supplied, that is, until the integrated value of the counter reaches a set point of acceleration stop and to reduce the value integrated during acceleration while the deceleration command signal $S_8$ is supplied, that is, until the reduced value of the counter reaches a set point of deceleration stop, a digital-analog (D/A) converter 109b which converts an output of the counter 109a into an analog signal, a frequency-voltage (F/V) converter 109k which is supplied with the output of the continuous moving distance detector 104 or the pulse oscillator 118 and converts the output into an analog signal (voltage) corresponding to the frequency, a differentiator 109l which differentiates the output of the converter 109k, an attenuator 109m which attenuates the output of the differentiator 109l, an adder 109c which adds the output of the D/A converter 109b, the output of the slow speed controller 109d and the output of the attenuator 109m in the same polarity to produce the speed signal $S_9$ having the acceleration-deceleration pattern in the form of trapezoid or triangle, a selector switch (relay) 109g for selectively applying the output of the continuous moving distance detector 104 or the pulse oscillator 118 to one input terminal of the AND element 109f, an operation switch 109i for switching the selector switch 109g by the acceleration command signal $S_7$, a selector switch (relay) 109h which operates in response to the operation command signal $S_6$ to selectively supply the output of the slow speed controller 109d to the adder 109c, a selector switch (relay) 109e which is switched in response to the signal $S_{4b}$ of $A_1 > B_1$ to supply the output $S_9$ of the adder 109c to the non-inverted input or inverted input of the controller 112 for variable speed motor, and a selector switch 109j for selectively applying the acceleration stop signal $S_{11}$ to the counter 109a as the deceleration command signal.

Figure 21:
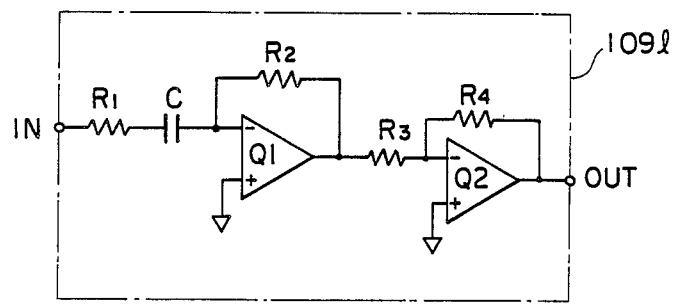
FIG. 21 is an actual circuit diagram showing a differentiator in the third invention.

FIG. 21 is an actual circuit diagram of the differentiator 109l of the velocity-acceleration pattern programming circuit 109, in which $Q_1$ and $Q_2$ represent operational amplifiers, $R_1$ to $R_4$ resistors, and C a condenser.

Figure 22:
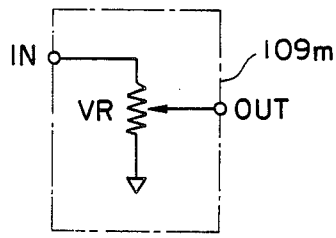
FIG. 22 is an actual circuit diagram showing an attenuator in the third invention.

FIG. 22 is an actual circuit diagram of the attenuator of the velocity-acceleration pattern programming circuit 109, which uses a variable resistor VR.

The F/V converter 109k uses a mold package type converter.

An acceleration stop command circuit 110 comprises an acceleration stop controller 110b, a digital comparator 110a which is supplied with a set signal $A_3$ of acceleration stop and an output $S_{10}$ (integrated or reduced value $B_3$ of continuous moving distance) of the counter 109a to compare them and produces a position signal $A_3 = B_3$ when both signals are coincident, and a hold circuit 110c which is supplied with an output of the comparator 110a to produce an acceleration stop signal $S_{11}$ and is reset by the operation command signal $S_6$ having 0 level.

A deceleration finish detector circuit 111 comprises a zero-set controller 111b which sets a set signal $A_4$ of deceleration finish, a digital comparator 111a which is supplied with the set signal $A_4$ and the output $S_{10}$ (integrated or reduced value $B_3$ of continuous moving distance) of the counter 109a and compares them to produce a coincidence signal $A_4 = B_3$ when both signals are coincident, an AND element 111c which is supplied with the coincident signal $A_4 = B_3$ and the operation command signal $S_6$, and a hold circuit 111d which is supplied with an output of the AND element 111c to produce the deceleration finish signal $S_{12}$ and is reset by the operation command signal $S_6$ having 0 level.

The controller 112 of a variable speed motor is supplied with the output $S_9$ of the adder 109c to the non-inverted input or the inverted input thereof to rotate the variable speed motor 113c unreversely or reversely and controls the speed of the motor 113c in accordance with the velocity pattern program. The controller 112 is formed of, for example, a motor control amplifier and includes a feedback circuit through a tachometer generator 113d.

(OPERATION OF THE EMBODIMENT)

Operation is now described.

In the initial state, the suspension type transporter is positioned so that the bolt drawing machine 115 is opposed to the first stud bolt shown in FIG. 11 and is to transport the bolt drawing machine 115 from the starting point (initial position) where the machine 115 is opposed to the first stud bolt to the target position, for example, the nth stud bolt position. In this case, the transit number $A_1$ is set to n, that is, $A_1 = n$ by the transit number controller 105a.

The stud bolt detector 103 detects the first position and produces the pulse $S_1$. The stud number counter 105c is supplied with the output $S_1$ and counts the number (No. 1) of the stud bolt. The digital comparator 105b compares the signal of the number $B_1$ (No. 1) with the signal of the transit number $A_1 = n$ and produces the signal of $A_1 = B_1$, $_IA_1 > B_1$ or $A_1 < B_1$ as the comparison result.

When the signal $S_{4a}$ of $A_1 = B_1$ is applied to the NOT element 107c of the operation command circuit 107, the output of the NOT element 107c becomes 0 level, while when the signal $S_{4a}$ is not applied to the NOT element 107c, the output of the NOT element 107c becomes 1 level (where all logics are handled in positive logic in the present invention). Accordingly, when the comparison result is $A_1 > B_1$ and $A_1 \neq B_1$, the output of the NOT element 107c is 1 level.

Since the start signal $S_2$ and the output of the NOT element 107c which are both 1 level are supplied to the two inputs of the AND element 107a, the output of the AND element 107a is 1 level and is applied to the hold circuit 107b. Since the output of the NOT element 107c is 1 level, the hold circuit 107b is in the set wait state. Accordingly, when the output of the AND element 107a is 1 level, the hold circuit 107b produces 1 level and the output of the hold circuit 107b is maintained to 1 level to produce it as the operation command signal $S_6$ until the output of the NOT element 107c is 0 level and the hold circuit 107b is reset.

The operation command signal $S_6$ switches the selector switch 109h of the velocity-acceleration pattern programming circuit 109 so that the set signal (analog voltage signal) of slow speed which is established by the slow speed controller 109d is applied to the adder 109c. The adder 109c produces the set signal of slow speed which is applied to the motor control amplifier 112 through the selector switch 109e which is switched to the non-inverted input side of the amplifier 112 by the signal of $A_1 > B_1$ produced from the digital comparator 105b of the transit discrimination circuit 105. Thus, the variable speed motor 113c of the trolley 113 is rotated at slow speed and the output of the tachometer generator 113d is applied to the motor control amplifier 112 as the feedback signal to form a closed lop of the motor control. Accordingly, the trolley 113, that is, the suspension type transporter 102 starts to move at the initial speed of Vo shown in the vertical axis of FIG. 11(A).

When the suspension type transporter 102 is moved and hence the suspended bolt drawing machine 115 is moved, force in the traveling direction is transmitted to the main shaft 116c through the holding member 116a and the slide holder 116b to rotate the wheel 116g. Accordingly, the guide mechanism 116 is moved on the track 116f together with the bolt drawing machine 115 through the wheel support 116d.

The continuous moving distance detector 104 detects the moving distance of the guide mechanism 116 and produces the pulse train $S_3$ corresponding to the moving distance. Since the operation command signal $S_6$ having 1 level is applied to the AND element 109f of the velocity-acceleration pattern programming circuit 109, the output pulse train $S_3$ of the continuous moving distance detector 104 applied to the AND element 109f through the selector switch 109g is applied to the counter 109f.

On the other hand, the operation command signal $S_6$ is applied to the AND element 108a of the acceleration command circuit 108. At this time, the acceleration stop signal $S_{11}$ is maintained 0 level and accordingly the output of the NOT element 108b is 1 level. Accordingly, since two inputs of the AND element 108a are both 1 level, the AND element 108a produces an output of 1 level which is applied to the up count terminal of the counter 109a as the acceleration command signal $S_7$.

The deceleration finish signal $S_{12}$ is 0 level, which is applied to the reset terminal of the counter 109a. Accordingly, the counter 109a starts to count the output pulse train of the AND element 109f (output pulse train of the continuous moving distance detector 104). Thus, the counter 109a integrates the output pulse train of the continuous moving distance detector 104 in the up-count mode and the integrated value is supplied to the D/A converter circuit 109b to be converted into the analog signal.

The adder 109c is supplied with the analog signal of the converter circuit 109b and the output of the slow speed controller 109d to add them and produces the speed signal shown by the rightward ascending inclination in the left side of the velocity pattern of FIG. 11(D). Since the produced speed signal is obtained by converting the digital signal to the analog signal, the speed signal is stepwise in detail as shown in a circle of FIG. 11(D). However, since the resolution is set to be sufficiently small, the suspension type transporter is not operated stepwise.

The digital comparator 110a of the acceleration stop command circuit 110 is supplied with the output (integrated value of the continuous moving distance) of the counter 109a and the output $A_3$ of the acceleration stop controller 110b to compare them and produces the coincident signal $A_3=B_3$ when both of them are coincident. The coincident signal is applied to the hold circuit 110c. Since the operation command signal $SP_6$ is 1 level and the reset terminal of the hold circuit is 1 level, the output of the hold circuit 110c becomes 1 level in response to the coincident signal $A_3=B_3$. Thus, the output of the hold circuit 110c is maintained 1 level which is produced as the acceleration stop signal $S_{11}$ until 0 level is applied to the reset terminal of the hold circuit 110c to reset the hold circuit 110c.

The acceleration stop signal $S_{11}$ is applied to the NOT element 108b of the acceleration command circuit 108 and the output of the NOT element 108b becomes 0 level. Accordingly, the output of the AND element 108a becomes 0 level and the acceleration command signal becomes 0 level. The up-count mode of the counter 109a is hence released to stop the integration operation. As described above, in the initial state, the transporter 102, the bolt drawing machine 115 and the guide mechanism 116 (hereinafter referred to as the transporter 102 and others) are moved at the initial speed Vo (refer to FIG. 11) given by the slow speed controller 109d. Subsequently, the rotary encoder forming the continuous moving distance detector 104 starts its rotation and the output pulses of the rotary encoder are integrated so that the traveling speed is gradually increased. However, the increase of the speed can be prevented by prescribing the number of integrated pulses, and the correspondence relation between the speed and the moving distance during acceleration can be obtained (refer to FIG. 11).

The relation can be realized by employing the pulse oscillator 118 in place of the continuous moving distance detector 104 and applying the output pulse of the pulse oscillator 118 to the counter 109a. In this case, when the switch 109i is closed, the selector switch 109g is switched by the acceleration command signal $S_7$ of 1 level to connect the pulse oscillator 118 to the AND element 109f so that the output pulse of the pulse oscillator 118 is applied to the counter 109a through the AND element 109f. Thus, the speed can be gradually increased by integrating the pulses in accordance with the moving distance, and further the increase of the speed can be stopped by prescribing the number of the integrated pulses in the same manner as above. When the pulse oscillator 118 is used, the inclined angle in acceleration of the velocity pattern shown in FIG. 11(A) can be adjusted in accordance with inertial load of the system by varying the frequency of the oscillator.

After the acceleration is stopped, the counter 109a does not perform the integration and accordingly the transporter 102 and others travel at constant speed Vc shown in the middle of FIG. 11(A).

Description is now made to operation that the transporter 102 and others start the deceleration and stops at the target position when the transporter 102 and others reach the deceleration start position near the target position.

The adder-subtractor 106a of the deceleration command circuit 106 is supplied with the output $A_1$ of the transit number controller 105a of the transit discrimination circuit 105 and the signal $A_{4b}$ of $A_1>B_1$ or the signal $S_{4c}$ of $A_1<B_1$ which is the output of the digital comparator 105b and subtracts or add the prescribed value C from or to the value $A_1$. The prescribed value C is a number of stud bolts for determining the starting position of the deceleration and the deceleration is started from a stud bolt which is placed before the nth stud bolt by the number of stud bolts determined by the value C. In FIG. 11, since the deceleration is started from the $(n-2)$th stud bolt, the prescribed value C is 2, that is, C=2. Determination of the prescribed value C is important.

The acceleration stop command circuit 110 compares the output (number of integrated pulses) $B_3$ of the counter 109a and the number of pulses corresponding to the value $A_3$ set by the acceleration stop controller 110b. When $A_3=B_3$, the integration operation of the counter 109a is stopped so that the speed is increased from Vo to Vc. In other words, by integrating the number of pulses corresponding to the value $A_3$ set by the acceleration stop controller 110b, the speed is increased from Vo to Vc. Accordingly, if the speed is reduced from Vc to Vo reversely, the transporter 102 and others may be moved by the number of pulses set by the acceleration stop controller 110b so that the pulses corresponding to the moving distance may be obtained from the continuous moving distance detector 104. That is, the number of pulses integrated by the counter 109a in acceleration may be reduced in deceleration. Accordingly, the value C is the number of spaces between the stud bolts in minimum corresponding to the moving distance corresponding to the set value of the acceleration stop controller 110b. It would be noted that the set value of the acceleration stop controller 110b is desirably determined so that the moving distance at the low speed Vo is minimized as short as possible.

The adder-subtracter 106a produces the output of $A_2 = A_1 + C$ or $A_2 = A_1 - C$ in accordance with the value C thus determined. The digital comparator 106b compares the output $A_2$ and the output $B_1$ of the stud number counter 105c and produces the coincident signal $A_2 = B_1$ to supply the coincident signal to the hold circuit 106c. The hold circuit 106c is reset when the signal of 0 level is supplied to the reset terminal of the hold circuit 106c. At this time, since the deceleration finish signal $S_{12}$ is 0 level, the output of the NOT element 106d is 1 level. Accordingly, the hold circuit 106c supplied with the signal $A_1 = B_1$ maintains its output to 1 level to produce the output as the deceleration command signal $S_8$.

Since the deceleration command signal $S_8$ is supplied to the down-count mode terminal of the counter 109a through the selector switch 109j, the number of integrated pulses held in the counter 109a is reduced in response to the output pulse of the continuous moving distance detector 104 or the pulse oscillator 118 after the transporter 102 and others pass through the stud bolt which is placed before the nth stud bolt of target by the number C of stud bolts. The velocity pattern at this time is represented by the inclination at the right end of the velocity pattern of FIG. 11(A).

When the integrated value of the counter 109a is reduced to zero, the output of the D/A converter 109b becomes zero. Accordingly, the output of the adder 109c is only the output of the slow speed controller 109d and the velocity of the transporter 102 and others is equal to Vo.

The digital comparator 111a of the deceleration finish detector circuit 111 compares the output $B_3$ of the counter 109a and the output (digital signal of zero value) $A_4$ of the zero-set controller 111b and produces the coincident signal $A_4 = B_3$ when the output value of the counter 109a becomes zero and both the input values are coincident. The AND element 111c is supplied with the output $A_4 = B_3$ and the operation command signal $S_6$ of 1 level and produces the output signal of 1 level. The hold circuit 111d is reset when a signal of 0 level is supplied to the reset terminal thereof. Since the reset terminal of the hold circuit 111d is now supplied with the operation command signal $S_6$ of 1 level, the hold circuit 111d is not reset. The hold circuit 111d is supplied with the 1 level output signal of the AND element 111c and maintains its output to 1 level to produce the output as the deceleration finish signal $S_{12}$.

The deceleration finish signal $S_{12}$ is supplied to the reset terminal of the counter 109a (which is reset by a signal of 1 level). The counter 109a is reset and is held to the reset state. The deceleration finish signal $S_{12}$ is also supplied to the reset terminal of the hold circuit 106c of the deceleration command circuit 106 through the NOT element 106d and resets the hold circuit 106c. The hold circuit 106c releases the deceleration command signal $S_8$ of 1 level and produces the output of 0 level.

Subsequently, the transporter 102 and others moves at the slow speed Vo. When the transporter 102 and others reach the nth stud bolt of target position, the output value of the stud number counter 105c counting the output pulses of the stud bolt detector 103 is equal to the value of n which is equal to the output value $A_1 = n$ of the transit number controller 105a. Accordingly, the digital comparator 105b produces the coincident signal $A_1 = B_1$ ($S_{4a}$).

The coincident signal $A_1 = B_1$ is supplied to the NOT element 107c of the operation command circuit 107 and the output of the NOT element 107c becomes 0 level. The output of the NOT element 107c is applied to the reset terminal of the hold circuit 107b to reset the hold circuit 107b. Accordingly, the hold circuit 107b releases the operation command signal $S_6$ of 1 level and produces the output of 0 level.

The 0 level output of the hold circuit 107b resets the hold circuit 110c of the acceleration command circuit 110 and the hold circuit 111d of the deceleration finish detector circuit 111. The output of the AND element 109f of the velocity pattern programming circuit 109 becomes 0 level irrespective of the state of the other input and does not apply any pulse to the counter 109a. The selector switch 109h is switched to disconnect the adder 109c from the slow speed controller 109d.

Since the selector switch 109h is switched and the output of the slow speed controller 109d producing the output of the slow speed Vo is not applied to the adder 109c, the transporter 102 and others are stopped at the target stud bolt position in accordance with the velocity pattern of FIG. 11(A).

The control described above is attained in accordance with the velocity pattern in the form of trapezoid, while the control is impossible theoretically when the deceleration start position does not correspond to the stud bolt. Accordingly, when it is desired that the transporter is moved to the adjacent stud bolt position, for example, from the first stud bolt to the second stud bolt as shown by the velocity pattern of broken line of FIG. 11(A), the velocity pattern must be triangular unlike the velocity pattern in the form of trapezoid. The velocity pattern in the form of triangle can be attained only by switching the selector switch 109j of the velocity pattern programming circuit 109 of FIG. 20 to the input side of the acceleration stop signal $S_{11}$.

In this case, the output value $A_3$ of the acceleration stop controller 110b of the acceleration stop command circuit 110 is set to a value which is a little smaller than a half of one interval between the stud bolts. Thus, the acceleration is stopped at that position and at the same time the deceleration is started. Operation of each portion is the same as that in the velocity pattern in the form of trapezoid.

Thus, the velocity pattern in the form of trapezoid or triangle in FIG. 11(A) is formed and the speed of the transporter 102 and others are controlled in accordance with the velocity pattern.

Operation of the guide mechanism 116 is now described. The guide mechanism 116 moves together with the bolt drawing machine 115. In this case, since movement of the bolt drawing machine in the lateral direction is restricted by the guide 116h and the guided contact portion 116i, twist of the suspending wire and rolling of the bolt drawing machine 115 can be prevented irrespective of traveling on the straight line and the curved line.

In the above described controller, the velocity pattern is formed into a trapezoid or triangle in order to prevent the bolt drawing machine from swinging in the traveling direction. However, in the result of the actual operation, there occurs swing having small amplitude in the traveling direction as shown by solid line of FIG. 11(E) as compared with the target velocity pattern of FIG. 11(A).

More particularly, even when the transporter 102 starts to move, the bolt drawing machine 115 and the guide mechanism 116 do not start to move immediately because of inertia. Accordingly, the bolt drawing machine and the guide mechanism start to move later than the start point as shown in the left end of the actual velocity pattern shown by solid line of FIG. 11(E).

When the bolt drawing machine 115 and the guide mechanism 116 start to move later than the transporter 102, they are encouraged and move at a faster speed than the transporter 102, passing the transporter 102. Then, the bolt drawing machine and the guide mechanism swing back about the transporter 102 and the cycle is repeated to continue the swing.

Figure 23A:
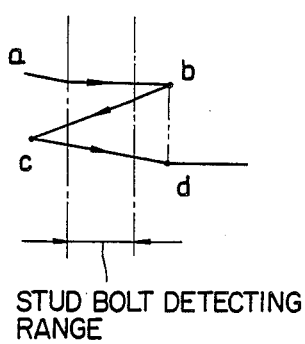
FIG. 23(A) illustrates the position detection and moving distance detection when there is not a swing prevention circuit of the controller of the third invention.
Figure 23B:
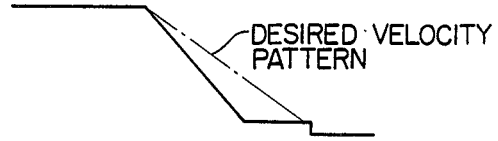
FIG. 23(B) illustrates a deceleration portion of a velocity pattern in the third invention.

When the sewing in the traveling direction occurs as described above and the swing back occurs in the stud bolt detecting range as shown in FIG. 23(A), the stud bolt detector 103 detects the stud bolt in error twice at the times when the bolt drawing machine and the guide mechanism swing forward from the point a to b and when swinging backward to c from b and swinging forward from c to d. Since the output pulses of the continuous moving distance detector 104 or the pulse oscillator 118 are produced excessively during the sections between b and c and c and d due to the swing back, the deceleration pattern in the velocity pattern is not formed in the same as the target velocity pattern as shown by one-dotted chain line of FIG. 23(B) and becomes a velocity pattern in which the deceleration is finished in earlier time as shown by solid line. Accordingly, the moving distance at the slow speed is long and the moving time to the target position is long. Further, the continuous moving distance detector 104 or the pulse oscillator 118 produces the pulse train having low density of time (long pulse interval) at the slow speed and produces the pulse train having high density of time (short pulse interval) at the high speed. Therefore, since the speed of the variable speed motor 113c is controlled in accordance with the velocity pattern, the controllability is deteriorated and the accuracy of positioning the bolt drawing machine 115 can not be satisfied.

While it can not be helped that the bolt drawing machine 115 and the guide mechanism 116 start to move later than the transporter 102, the present invention utilizes the fact that the swing back of the bolt drawing machine 115 and the guide mechanism 116 does not occur if the transporter 102 is not passed by the bolt drawing machine 115 and the guide mechanism 116. Thus, the swing back prevention circuit composed of the F/V converter 109k, the differentiator 109l and the attenuator 109m disposed in the input side of the adder 109c is added as in the velocity-acceleration pattern programming circuit 109 to suppress the swing back. Operation thereof is now described.

When the bolt drawing machine 115 and the guide mechanism 116 start to move later than the transporter 102 and swing as shown in FIG. 24(C), the frequency of the output pulse train of the continuous moving distance detector 104 or the pulse oscillator 118 is changed. The pulse train is supplied to the F/V converter 109k and is converted into an analog signal (voltage). The analog signal has the analog value in the same waveform as shown by solid line of FIG. 24(C). The output of the F/V converter 109k is differentiated in the differentiator 109l which produces the differentiated signal as shown in FIG. 24(B). That is, the differentiator produces the differentiated signal having the polarity of (+) when the analog signal is increased as shown by the rightward increasing inclination of FIG. 24(C), while the differentiator produces the signal having the polarity of (−) when the analog signal is reduced as shown by the rightward reducing inclination. The output of the differentiator 109l is attenuated by the attenuator 109m to a signal having proper level, which is supplied to the adder 109d together with the outputs of the D/A converter 109b and the slow speed controller 109d. Consequently, a sum signal, that is, a signal having a corrected velocity pattern as shown in FIG. 24(A) is produced. In other words, when the bolt drawing machine 115 and the guide mechanism 116 are first accelerated suddenly, the frequency of the output pulse train of the continuous moving distance detector 104 or the pulse oscillator 118 is increased. The frequency of the output pulse train is converted into the analog signal by the F/V converter 109k. The analog signal is differentiated by the differentiator 109l. The differentiated signal having the polarity of (+) (first waveform of FIG. 24(B)) is supplied to the adder 109c through the attenuator 109m together with the two other signals. Thus, the signal (first signal) having the velocity pattern shown by solid line faster than the target velocity pattern shown by one-dotted chain of FIG. 24(A) is produced to increase the velocity of the variable speed motor 113c so that the transporter 102 travels faster than the velocity of the target velocity pattern. Consequently, the bolt drawing machine 115 and the guide mechanism 116 are difficult to swing back.

When the swing back is not avoided due to excessive rapid acceleration, the differentiator 109l produces the differentiated output signal having the polarity of (−) (refer to FIG. 24(B)). The differentiated output signal is supplied to the adder 109c through the attenuator 109m together with the two other signals so that the transporter 102 travels slower than the velocity of the target velocity pattern. Consequently, the bolt drawing machine 115 and the guide mechanism 116 are difficult to swing back largely.

While operation of the hoist 114 is not described above, the hoist merely performs simple operation such as ascent and descent in a manner not shown before the trolley 113 starts to move and after the trolley 113 has moved in accordance with the velocity pattern of FIG. 24(A). Restriction for ascent and descent at this time may be attained by a signal of a proximity switch which is mounted so that the switch detects relative position of the main shaft 116c and the slide holder 116b of the guide mechanism 116, while not shown. Thus, it is not required that the hoist 114 includes function of detecting the position for ascent and descent.

The present invention is not limited to the case where the bolt drawing machine is suspended and be transported to the target stud bolt position, but can be widely applied to the case where an object is suspended to be transported to a target position.

Generally, as be readily understood from FIG. 9(A), the suspended object can be transported to the target position by attaining the positioning of the suspended object by the many position detection objects 101a and position detectors 103 placed side by side, determining the target position to one of the position detection objects 101a and configuring the controller as shown in FIG. 12.

INDUSTRIAL AVAILABILITY OF THE INVENTION

As described above, the suspension type transporter for the bolt drawing machine and the positioning controller according to the present invention is useful for a plant for installing a relatively large pressure container having many bolts attached thereto. Particularly, these apparatuses is suitable for devices requiring the exact positioning control to the target position and the traveling speed control in which the swinging in the traveling direction of the suspended object during traveling and the twist of the various cables and hoses connected to the suspended object are prevented.

We claim:

1. A suspension type transporter which transports a bolt drawing machine while suspending the bolt drawing machine, comprising:

a guide mechanism including a holding member fixedly mounted to the bolt drawing machine, a cylindrical slide holder mounted vertically to said holding member, a main shaft penetrating said slide holder movably in the vertical direction and rotatably, a wheel support mounted to a lower end of said main shaft, a wheel supported by said wheel support to rotate on a track disposed on a stationary portion at a floor side, a guide provided along the stationary portion, and a guided contact portion disposed to a side surface of said guide to be opposed to said wheel support with a small gap between said wheel support and said contact portion, whereby movement of the bolt drawing machine in the air is restricted.

2. A suspension type transporter according to claim 1, wherein said guide is formed on both sides of the track.

3. A suspension type transporter according to claim 1, wherein said track and guide are provided on an upper surface of the stationary portion on the floor side.

4. A suspension type transporter according to claim 1, wherein studs to be drawn by the bolt drawing machine include round nuts and said guide mechanism includes a guide member capable of being fitted into a substantially V-shaped gap formed by sides of two round nuts adjacent to each other and an actuator capable of moving said guide member between a first position where said guide member is fitted into the substantially V-shaped gap and a second position where said guide member is outside of the gap, a pair of said guide mechanism being mounted to substantially symmetrical positions of the bolt drawing machine.

5. A positioning controller of a suspension type transporter provided with a guide mechanism including a holding member fixedly mounted to a suspension type bolt drawing machine, a cylindrical slide holder mounted vertically to the holding member, a main shaft penetrating the slide holder movably in the vertical direction and rotatably, a wheel support mounted to a lower end of the main shaft, a wheel supported by the wheel support to rotate on a track disposed on a stationary portion at a floor side, a guide provided along the stationary portion, and a guided contact portion disposed to a side surface of the guide to be opposed to the wheel support with a small gap between the wheel support and the contact portion, whereby movement of the bolt drawing machine in the air is restricted, comprising:

position detector means provided in said guide mechanism for detecting successively a multiple of position detecting objects juxtaposed along the guide to produce a pulse $S_1$ in order to stop the bolt drawing machine at a target position; continuous moving distance detector means for detecting a moving distance of the bolt drawing machine from a first detection position in which a first position detecting object is detected to produce a pulse train $S_3$ or pulse generator means for generating a pulse train in response to the moving distance of the bolt drawing machine; transit discrimination means for producing a signal $S_{5b}$ for a count (number of the position detecting object at a current position) $B_1$ of the output pulse of said position detector means, a signal $S_{5a}$ for a set point of a transit number (number of the position detecting object at the target position) $A_1$, and signals $S_{4a} \sim S_{4c}$ corresponding to comparison results $A_1 = B_1$, $A_1 > B_1$ and $A_1 < B_1$ of the signals $S_{5a}$ and $S_{5b}$; operation command means supplied with the signal $S_{4a}$ corresponding to the comparison result $A_1 = B_1$ of said transit discrimination means and a start signal $S_2$ to produce an operation command signal $S_6$ when $A_1 \neq B_1$ and prohibit operation when $A_1 = B_1$; acceleration command means supplied with an output of the operation command circuit to produce an acceleration command signal $S_7$; deceleration command means supplied with the signals $S_{5a}$, $S_{5b}$, $S_{4b}$ and $S_{4c}$ corresponding to $A_1$, $B_1$, $A_1 > B_1$ and $A_1 < B_1$ to produce a deceleration command signal $S_8$; velocity pattern programming means supplied with the operation command signal $S_6$ to produce a set signal of slow speed and in which an output signal of said continuous moving distance detector means or said pulse generator means is integrated in response to the acceleration command signal $S_7$ until the output of said continuous moving distance detector means or said pulse generator means reaches a set point of acceleration stop after start and the integration is stopped when the output reaches the set point of acceleration stop while the value integrated during acceleration is reduced in response to the deceleration command signal $S_8$ until the integrated value reaches a set point of deceleration finish, so that a sum signal of an analog signal corresponding to the integrated value or the reduced value and the set signal of slow speed is produced to be supplied to a controller for a variable speed motor of the suspension type transporter; acceleration stop command means for comparing a signal $S_{10}$ corresponding to the integrated value or the reduced value of said velocity pattern programming means with a set signal $A_3$ corresponding to an acceleration stop position and producing an acceleration stop signal $S_{11}$ when both the signals are equal thereby to prohibit operation of said acceleration command means; and deceleration finish detector means for comparing the signal $S_{10}$ with a set signal $A_4$ corresponding to a velocity of zero and producing a deceleration finish signal $S_{12}$ when both the signals are equal thereby to prohibit the reduction operation of said velocity pattern programming means and operation of said deceleration command means.

6. A positioning controller of the suspension type transporter provided with a guide mechanism including a holding member mounted to a suspension type bolt drawing machine, a cylindrical slide holder mounted vertically to the holding member, a main shaft penetrating the slide holder movably in the vertical direction and rotatably, a wheel support mounted to a lower end of the main shaft, a wheel supported by the wheel support to rotate on a track disposed on a stationary portion at a floor side, a guide provided along the stationary portion, and a guided contact portion disposed to a side surface of the guide to be opposed to the wheel support with a small gap between the wheel support and the contact portion, whereby movement of the bolt drawing machine in the air is restricted, comprising:

position detector means provided in the guide mechanism for detecting successively a multiple of position detecting objects juxtaposed along the guide to produce a pulse $S_1$ in order to stop the bolt drawing machine at a target position; continuous moving distance detector means for detecting a moving distance of the bolt drawing machine from a first detection position in which a first position detecting object is detected to produce a pulse train $S_3$ or pulse generator means for generating a pulse train in response to the moving distance of the bolt drawing machine; transit discrimination means for producing a signal $S_{5b}$ for a count (number of the position detecting object at a current position) $B_1$ of the output pulse of said position detector means, a signal $S_{5a}$ for a set point of a transit number (number of the position detecting object at the target position) $A_1$, and signals $S_{4a} \sim S_{4c}$ corresponding to comparison results $A_1 = B_1$, $A_1 > B_1$ and $A_1 < B_1$ of the signals $S_{5a}$ and $S_{5b}$; operation command means supplied with the signal $S_{4a}$ corresponding to the comparison result $A_1 = B_1$ of said transit discrimination means and a start signal $S_2$ to produce an operation command signal $S_6$ when $A_1 \neq B_1$ and prohibit operation when $A_1 = B_1$; acceleration command means supplied with an output of said operation command means to produce an acceleration command signal $S_7$; deceleration command means supplied with the signals $S_{5a}$, $S_{5b}$, $S_{4b}$ and $S_{4c}$ corresponding to $A_1$, $B_1$, $A_1 > B_1$ and $A_1 < B_1$ to produce a deceleration command signal $S_8$; velocity-acceleration pattern programming means supplied with the operation command signal $S_6$ to produce a set signal of slow speed and in which an output signal of said continuous moving distance detector means or said pulse generator means is integrated in response to the acceleration command signal $S_7$ until the output of said continuous moving distance detector means or said pulse generator means reaches a set point of acceleration stop after start and the integration is stopped when the output reaches the set point of acceleration stop while the value integrated during acceleration is reduced in response to the deceleration command signal $S_8$ until the integrated value reaches a set point of deceleration finish, so that a sum signal of an analog signal corresponding to the integrated value or the reduced value, the set signal of slow speed and a signal obtained by converting the output of said continuous moving distance detector means into an analog signal corresponding to a frequency and differentiating the analog signal is produced to be supplied to a controller for a variable speed motor of the suspension type transporter; acceleration stop command means for comparing a signal $S_{10}$ corresponding to the integrated value or the reduced value of said velocity-acceleration pattern programming means with a set signal $A_3$ corresponding to an acceleration stop position and producing an acceleration stop signal $S_{11}$ when both the signals are equal thereby to prohibit operation of said acceleration command means; and deceleration finish detector means for comparing the signal $S_{10}$ with a set signal $A_4$ of deceleration finish and producing a deceleration finish signal $S_{12}$ when both the signals are equal thereby to prohibit the reduction operation of said velocity-acceleration pattern programming means and operation of said deceleration command means.

7. A suspension type transporter which transports a bolt drawing machine while suspending the bolt drawing machine, comprising:

a guide mechanism including a holding member fixedly mounted to the bolt drawing machine, a cylindrical slide holder mounted vertically to said holding member, a main shaft penetrating said slide holder movably in the vertical direction and rotatably, a wheel support mounted to a lower end of said main shaft, a wheel supported by said wheel support to rotate on a track disposed on a stationary portion at a floor side, a guide provided along the stationary portion, and a guided contact portion disposed to a side surface of said wheel support to be opposed to said guide with a small gap between said guide and said contact portion, whereby movement of the bolt drawing machine in the air is restricted.

8. A suspension type transporter according to claim 7, wherein said guide is formed on both sides of the track.

9. A suspension type transporter according to claim 7, wherein said track and guide are provided on an upper surface of the stationary portion on the floor side.

10. A suspension type transporter according to claim 7, wherein studs to be drawn by the bolt drawing machine include round nuts and said guide mechanism includes a guide member capable of being fitted into a substantially V-shaped gap formed by sides of two round nuts adjacent to each other and an actuator capable of moving said guide member between a first position where said guide member is fitted into the substantially V-shaped gap and a second position where said guide member is outside of the gap, a pair of said guide mechanism being mounted to substantially symmetrical positions of the bolt drawing machine.

11. A positioning controller of a suspension type transporter provided with a guide mechanism including a holding member fixedly mounted to a suspension type bolt drawing machine, a cylindrical slide holder mounted vertically to the holding member, a main shaft penetrating the slide holder movably in the vertical direction and rotatably, a wheel support mounted to a lower end of the main shaft, a wheel supported by the wheel support to rotate on a track disposed on a stationary portion at a floor side, a guide provided along the stationary portion, and a guided contact portion disposed to a side surface of the wheel support to be opposed to the guide with a small gap between the guide and the contact portion, whereby movement of the bolt drawing machine in the air is restricted, comprising:

position detector means provided in said guide mechanism for detecting successively a multiple of position detecting objects juxtaposed along the guide to produce a pulse $S_1$ in order to stop the bolt drawing machine at a target position; continuous moving distance detector means for detecting a moving distance of the bolt drawing machine from a first detection position in which a first position detecting object is detected to produce a pulse train $S_3$ or pulse generator means for generating a pulse train in response to the moving distance of the bolt drawing machine; transit discrimination means for producing a signal $S_{5b}$ for a count (number of the position detecting object at a current position) $B_1$ of the output pulse of said position detector means, a signal $S_{5a}$ for a set point of a transit number (number of the position detecting object at the target position) $A_1$, and signals $S_{4a} \sim S_{4c}$ corresponding to comparison results $A_1 = B_1$, $A_1 > B_1$ and $A_1 < B_1$ of the signals $S_{5a}$ and $S_{5b}$; operation command means supplied with the signal $S_{4a}$ corresponding to the comparison result $A_1 = B_1$ of said transit discrimination means and a start signal $S_2$ to produce an operation command signal $S_6$ when $A_1 \neq B_1$ and prohibit operation when $A_1 = B_1$; acceleration command means supplied with an output of the operation command circuit to produce an acceleration command signal $S_7$; deceleration command means supplied with the signals $S_{5a}$, $S_{5b}$, $S_{4b}$ and $S_{4c}$ corresponding to $A_1$, $B_1$, $A_1 > B_1$ and $A_1 < B_1$ to produce a deceleration command signal $S_8$; velocity pattern programming means supplied with the operation command signal $S_6$ to produce a set signal of slow speed and in which an output signal of said continuous moving distance detector means or said pulse generator means is integrated in response to the acceleration command signal $S_7$ until the output of said continuous moving distance detector means or said pulse generator means reaches a set point of acceleration stop after start and the integration is stopped when the output reaches the set point of acceleration stop while the value integrated during acceleration is reduced in response to the deceleration command signal $S_8$ until the integrated value reaches a set point of deceleration finish, so that a sum signal of an analog signal corresponding to the integrated value or the reduced value and the set signal of slow speed is produced to be supplied to a controller for a variable speed motor of the suspension type transporter; acceleration stop command means for comparing a signal $S_{10}$ corresponding to the integrated value or the reduced value of said velocity pattern programming means with a set signal $A_3$ corresponding to an acceleration stop position and producing an acceleration stop signal $S_{11}$ when both the signals are equal thereby to prohibit operation of said acceleration command means; and deceleration finish detector means for comparing the signal $S_{10}$ with a set signal $A_4$ corresponding to a velocity of zero and producing a deceleration finish signal $S_{12}$ when both the signals are equal thereby to prohibit the reduction operation of said velocity pattern programming means and operation of said deceleration command means.

12. A positioning controller of the suspension type transporter provided with a guide mechanism including a holding member mounted to a suspension type bolt drawing machine, a cylindrical slide holder mounted vertically to the holding member, a main shaft penetrating the slide holder movably in the vertical direction and rotatably, a wheel support mounted to a lower end of the main shaft, a wheel supported by the wheel support to rotate on a track disposed on a stationary portion at a floor side, a guide provided along the stationary portion, and a guided contact portion disposed to a side surface of the wheel support to be opposed to the guide with a small gap between the guide and the contact portion, whereby movement of the bolt drawing machine in the air is restricted, comprising:

position detector means provided in the guide mechanism for detecting successively a multiple of position detecting objects juxtaposed along the guide to produce a pulse $S_1$ in order to stop the bolt drawing machine at a target position; continuous moving distance detector means for detecting a moving distance of the bolt drawing machine from a first detection position in which a first position detecting object is detected to produce a pulse train $S_3$ or pulse generator means for generating a pulse train in response to the moving distance of the bolt drawing machine; transit discrimination means for producing a signal $S_{5b}$ for a count (number of the position detecting object at a current position) $B_1$ of the output pulse of said position detector means, a signal $S_{5a}$ for a set point of a transit number (number of the position detecting object at the target position) $A_1$, and signals $S_{4a} \sim S_{4c}$ corresponding to comparison results $A_1 = B_1$, $A_1 > B_1$ and $A_1 B_1$ of the signals $S_{5a}$ and $S_{5b}$; operation command means supplied with the signal $S_{4a}$ corresponding to the comparison result $A_1 = B_1$ of said transit discrimination means and a start signal $S_2$ to produce an operation command signal $S_6$ when $A_1 \neq B_1$ and prohibit operation when $A_1 = B_1$; acceleration command means supplied with an output of said operation command means to produce an acceleration command signal $S_7$; deceleration command means supplied with the signals $S_{5a}$, $S_{5b}$, $S_{4b}$ and $S_{4c}$ corresponding to $A_1$, $B_1$, $A_1 > B_1$ and $A_1 < B_1$ to produce a deceleration command signal $S_8$; velocity-acceleration pattern programming means supplied with the operation command signal $S_6$ to produce a set signal of slow speed and in which an output signal of said continuous moving distance detector means or pulse generator means is integrated in response to the acceleration command signal $S_7$ until the output of said continuous moving distance detector means or said pulse generator means reaches a set point of acceleration stop after start and the integration is stopped when the output reaches the set point of acceleration stop while the value integrated during acceleration is reduced in response to the deceleration command signal $S_8$ until the integrated value reaches a set point of deceleration finish, so that a sum signal of an analog signal corresponding to the integrated value or the reduced value, the set signal of slow speed and a signal obtained by converting the output of said continuous moving distance detector means into an analog signal corresponding to a frequency and differentiating the analog signal is produced to be supplied to a controller for a variable speed motor of the suspension type transporter; acceleration stop command means for comparing a signal $S_{10}$ corresponding to the integrated value or the reduced value of said velocity-acceleration pattern programming means with a set signal $A_3$ corresponding to an acceleration stop position and producing an acceleration stop signal $S_{11}$ when both the signals are equal thereby to prohibit operation of said acceleration command means; and deceleration finish detector means for comparing the signal $S_{10}$ with a set signal $A_4$ of deceleration finish and producing a deceleration finish signal $S_{12}$ when both the signals are equal thereby to prohibit the reduction operation of said velocity-acceleration pattern programming means and operation of said deceleration command means.

* * * * *